United States Patent
Arimoto

(10) Patent No.: US 8,484,597 B2
(45) Date of Patent: Jul. 9, 2013

(54) INTEGRATED CIRCUIT MANUFACTURING METHOD, DESIGN METHOD AND PROGRAM

(75) Inventor: Hiroshi Arimoto, Yokohama (JP)

(73) Assignee: Fujitsu Semiconductor Limited, Yokohama (JP)

(*) Notice: Subject to any disclaimer, the term of this patent is extended or adjusted under 35 U.S.C. 154(b) by 188 days.

(21) Appl. No.: 13/075,789

(22) Filed: Mar. 30, 2011

(65) Prior Publication Data

US 2011/0252391 A1 Oct. 13, 2011

(30) Foreign Application Priority Data

Apr. 12, 2010 (JP) ................................. 2010-091722

(51) Int. Cl.
*G06F 17/50* (2006.01)
(52) U.S. Cl.
USPC ............ 716/113; 716/100; 716/110; 716/134
(58) Field of Classification Search
USPC .................... 716/100, 110, 113, 134
See application file for complete search history.

(56) References Cited

U.S. PATENT DOCUMENTS

| | | | |
|---|---|---|---|
| 6,074,429 A | 6/2000 | Pullela et al. | |
| 6,618,837 B1 * | 9/2003 | Zhang et al. | 716/111 |
| 7,685,543 B2 * | 3/2010 | Tsuji et al. | 716/106 |
| 7,934,178 B2 * | 4/2011 | Arimoto | 716/100 |
| 8,024,674 B2 * | 9/2011 | Arimoto | 716/51 |
| 8,056,020 B2 * | 11/2011 | Yamada | 716/50 |
| 2008/0221854 A1 | 9/2008 | Arimoto et al. | |
| 2009/0024968 A1 | 1/2009 | Yamada | |

FOREIGN PATENT DOCUMENTS

| | | |
|---|---|---|
| JP | 05-326705 A | 12/1993 |
| JP | 10-256387 A | 9/1998 |
| JP | 2008-250981 A | 10/2008 |
| JP | 2009-026829 A | 2/2009 |
| JP | 2009-086700 A | 4/2009 |

* cited by examiner

*Primary Examiner* — Sun Lin
(74) *Attorney, Agent, or Firm* — Arent Fox LLP

(57) ABSTRACT

An integrated circuit manufacturing method comprising: calculating a threshold value from a value of a parameter which characterizes at least a part of a design pattern shape of a transistor on the target path; calculating a difference between the calculated threshold value and a target threshold value; calculating a change quantity of a gate length corresponding to the difference between the threshold value and the target threshold value according to the functional relation between the threshold value of the transistor and the gate length, which is determined based on the empirical value or the experimental value; reducing, by the change quantity, the gate length of the transistor on the target path; and manufacturing an integrated circuit on the basis of design information of the circuit including the transistor of which the gate length is changed.

10 Claims, 22 Drawing Sheets

- P1: DESIGN INTEGRATED CIRCUIT
- P2: MANUFACTURE MASK
- P3: MANUFACTURE INTEGRATED CIRCUIT
  - FORMATION OF TRANSISTOR
  - IMPLANTATION OF CHANNEL IMPURITY
  - GROWTH OF STRESS GENERATING FILM AND INSULATING FILM AND PATTERN FORMATION
  - FORMATION OF OXIDE FILM
  - FORMATION OF CONTACT HOLE
  - FORMATION OF WIRING LAYER
  - FORMATION OF PROTECTION FILM
  - DICING, BONDING

INTEGRATED CIRCUIT MANUFACTURING METHOD, DESIGN METHOD AND PROGRAM

CROSS-REFERENCE TO RELATED APPLICATION

This application is based upon and claims the benefit of priority of the prior Japanese Patent Application No. 2010-091722, filed on Apr. 12, 2010 in the Japanese Patent Office, the entire contents of which are incorporated herein by reference.

FIELD

The present invention relates to an integrated circuit manufacturing method.

BACKGROUND

A design of a general type of integrated circuit involves, for example, performing a time-wise analysis for a circuit and subsequently identifying a "critical path", i.e., a "speed path". Then, elements or components on this critical path are analyzed. Subsequently, a speed, power consumption, a chip size, etc are optimized for acquiring a desired operation speed of the circuit as a whole by conducting replacement with other cells or changing transistors to other types of transistors having different threshold values.

Further, after starting the manufacture also, in high-performance product which pursues high-speed performance, a threshold value is reduced by uniformly decreasing gate lengths of a chip as a whole or decreasing a concentration of a channel impurity in a way that changes a process recipe, thus taking measures for accelerating an operation speed of the chip.

The reduction in threshold value by uniformly decreasing the gate lengths or decreasing the concentration of the channel impurity is, however, a tradeoff with a rise in off-leak current. Hence, such a process change can not be made randomly, and improvement of the performance is limitative. Nevertheless, a background of implementing these measures leis in a request for manufacturing as many chips performing the high-speed operations as possible in a tradeoff relation between the speed and the power consumption.

[Patent document 1] Japanese Patent Laid-Open Publication No. 2009-86700
[Patent document 2] Japanese Patent Laid-Open Publication No. H10-256387
[Patent document 3] Japanese Patent Laid-Open Publication No. H05-326705
[Patent document 4] Japanese Patent Laid-Open Publication No. 2009-26829
[Patent document 5] Japanese Patent Laid-Open Publication No. 2008-250981

SUMMARY

For accomplishing the object, one aspect of the technology of the disclosure can be exemplified as an integrated circuit manufacturing method. The integrated circuit manufacturing method includes calculating a period of signal propagation time of a path within a circuit in accordance with a signal propagation characteristic of circuit elements included by the circuit and a signal propagation characteristic of a transmission path which connects the circuit elements to each other; and selecting a path, as a target path, of which the signal propagation time does not satisfy a predetermined standard or a time-wise allowance is within the standard but is small. The integrated circuit manufacturing method further includes extracting a value of a parameter which characterizes at least a part of a design pattern shape of a transistor on the target path; and calculating a threshold value from the extracted parameter value according to a functional relation between the parameter and the threshold value of the transistor, which is determined based on an empirical value or an experimental value. Then, the integrated circuit manufacturing method includes calculating a difference between the calculated threshold value and a target threshold value; and calculating a change quantity of a gate length corresponding to the difference between the threshold value and the target threshold value according to the functional relation between the threshold value of the transistor and the gate length, which is determined based on the empirical value or the experimental value. Moreover, the integrated circuit manufacturing method includes reducing, by the change quantity, the gate length of the transistor on the target path; and manufacturing a circuit from design information of the circuit including the transistor of which the gate length is changed.

The object and advantage of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT

An integrated circuit manufacturing method according to one embodiment will hereinafter be described with reference to the drawings. A configuration in the following embodiment is an exemplification, and the present manufacturing method is not limited to procedures or a configuration in the embodiment.

<Characteristics of Transistor and Peripheral Layout>

Figure 1:
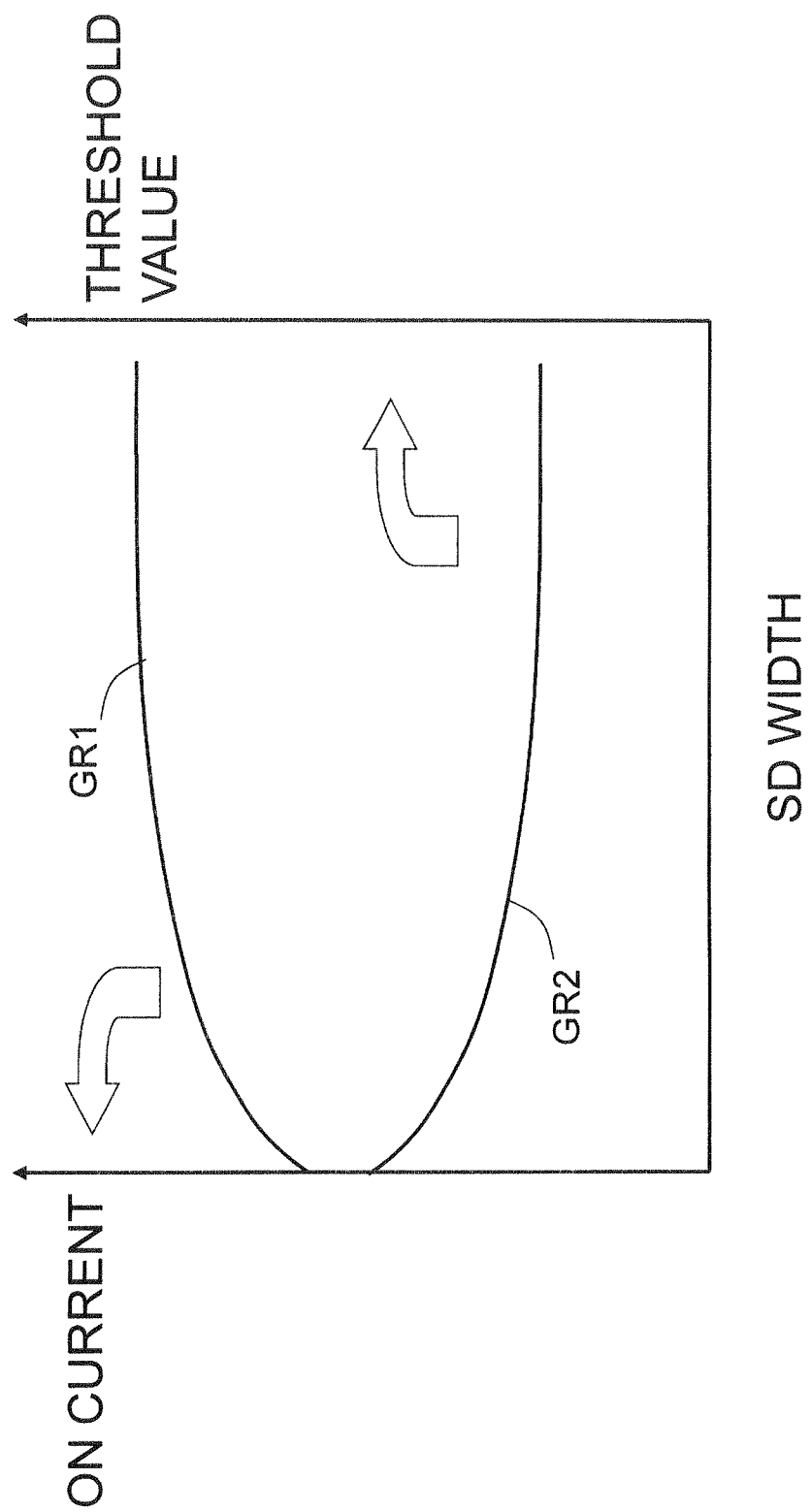
FIG. 1 is a diagram illustrating an example of a relation between a peripheral layout of a transistor and a characteristic of the transistor.

FIG. 1 is a diagram illustrating an example of a relation between a parameter of peripheral layout of a transistor and a transistor characteristic. Herein, the parameter of the peripheral layout information of the transistor can involve using, e.g., a distance from a gate to an end of an SD (Source/Drain) region, which is called an active region width or an SD width. FIG. 1 is a diagram formed by plotting values taken by an ON current and a threshold value of the transistor with respect to the SD width.

In FIG. 1, the axis on the left side represents the ON current and corresponds to a value of a graph GR1 on the upper side. The ON current can be generally said to be a current flowing to between a source and a drain when the transistor is in an ON-state. Further, in FIG. 1, the axis on the right side represents a threshold value of the transistor and corresponds to a value of a graph GR2 on the lower side. The threshold value can be generally said to be a gate voltage when the transistor changes from an OFF-state (in which no current flows to between the source and the drain) to the ON-state (in which the current flows to between the source and the drain). As illustrated in FIG. 1, the threshold value is deeper as the SD width gets narrower. A phrase "the threshold value is deeper" connotes that the threshold takes a positive larger value in FIG. 1. On the other hand, the ON current decreases corresponding to the increase in threshold value.

Figure 2:
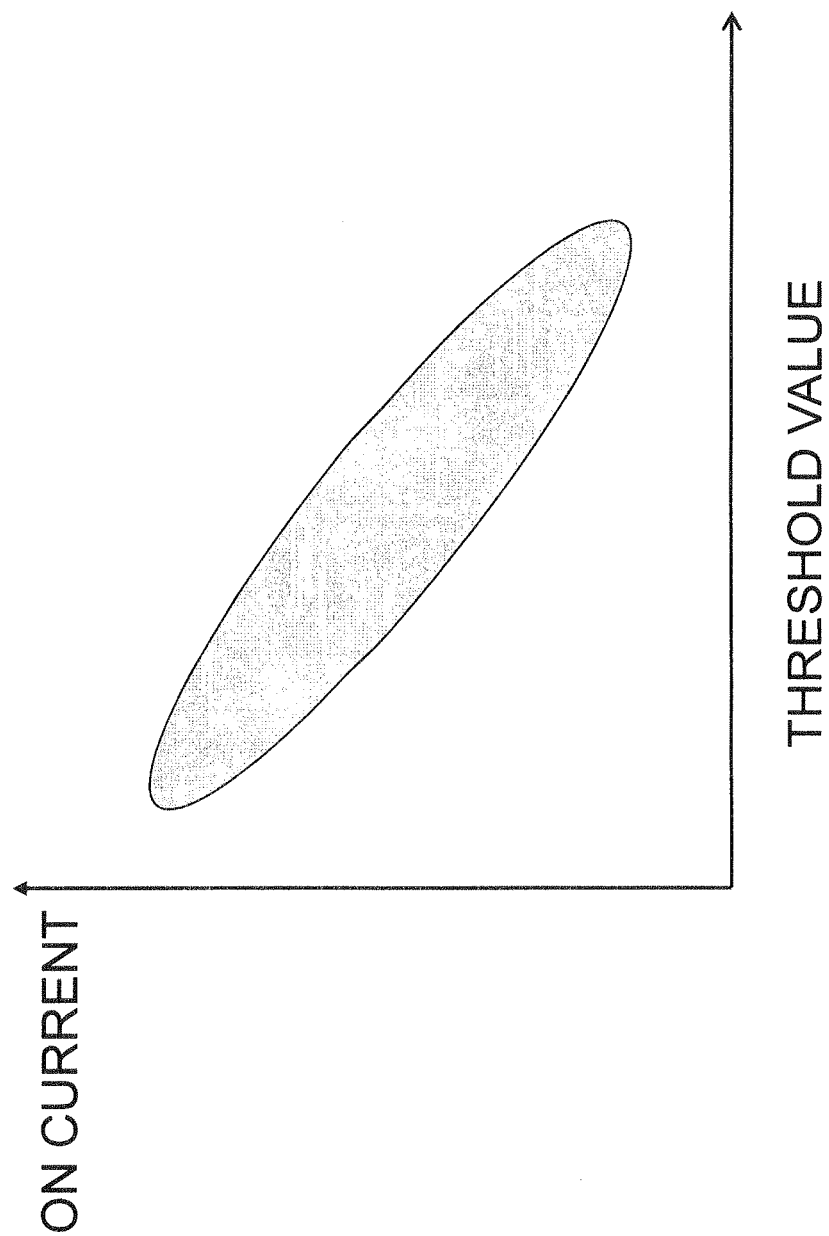
FIG. 2 is a diagram illustrating an example of a relation between a threshold value of the transistor and an ON-current thereof.

FIG. 2 illustrates an example of a relation between the threshold value and the ON current of the transistor. Generally, as depicted in FIG. 2, the threshold value and the ON current have a negative correlation, and the ON current becomes smaller as the threshold value becomes deeper and larger.

Figure 3:
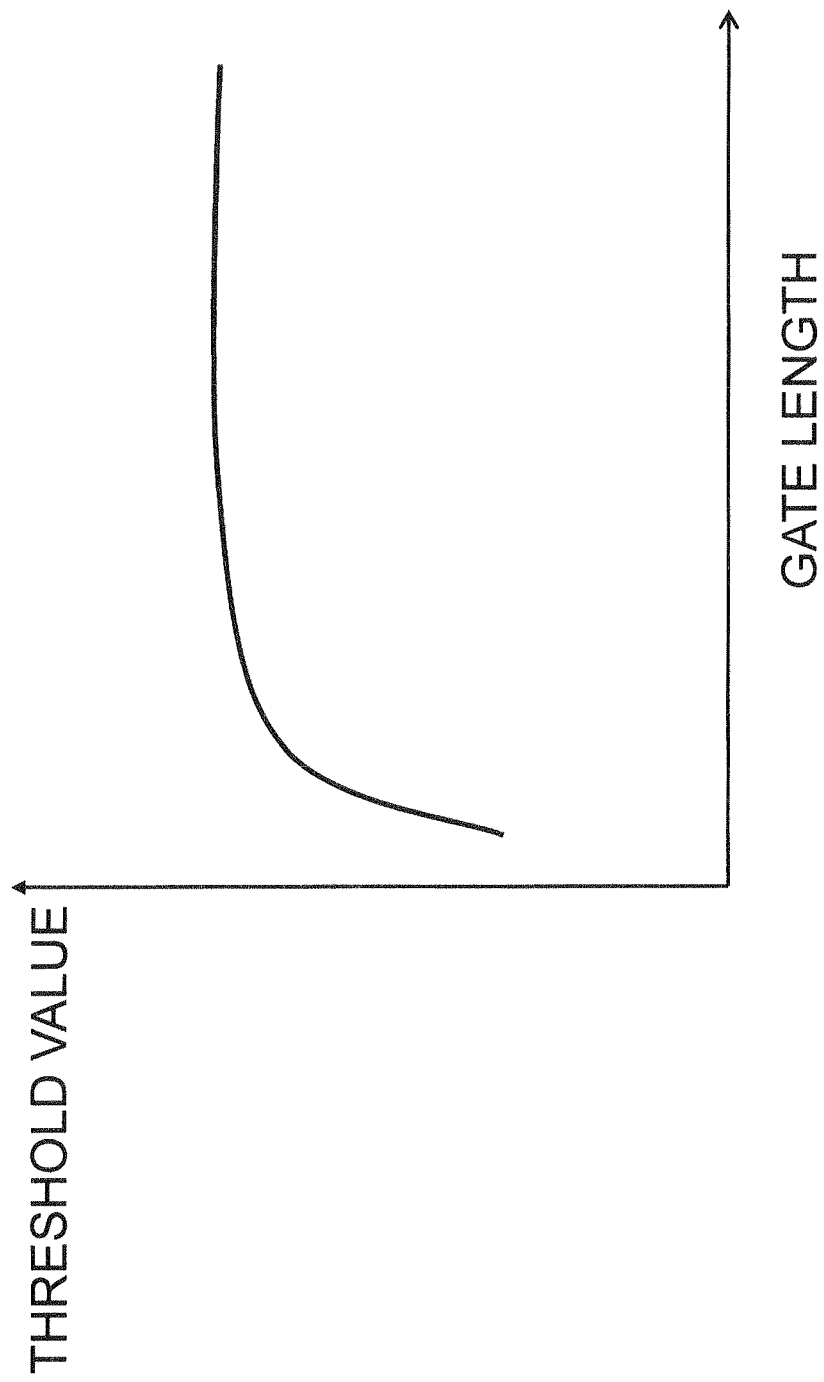
FIG. 3 is a diagram illustrating an example of a relation between a gate length and a threshold value.

FIG. 3 illustrates an example of a relation between a gate length and the threshold value. As illustrated in FIG. 3, such a short channel effect is generally well known that when reducing the gate length, the threshold value becomes shallower, i.e., the threshold value becomes smaller with the result that the ON current rises. The present manufacturing method puts a focus on a tendency in FIGS. 1-3 and is targeted at the transistor having the deeper threshold value and the decreased ON current, and the gate length of the transistor is reduced. The present manufacturing method adopts this process, thereby enabling an operation speed of the circuit to be increased by raising the ON current without augmenting an off-leak current so much.

Figure 4:
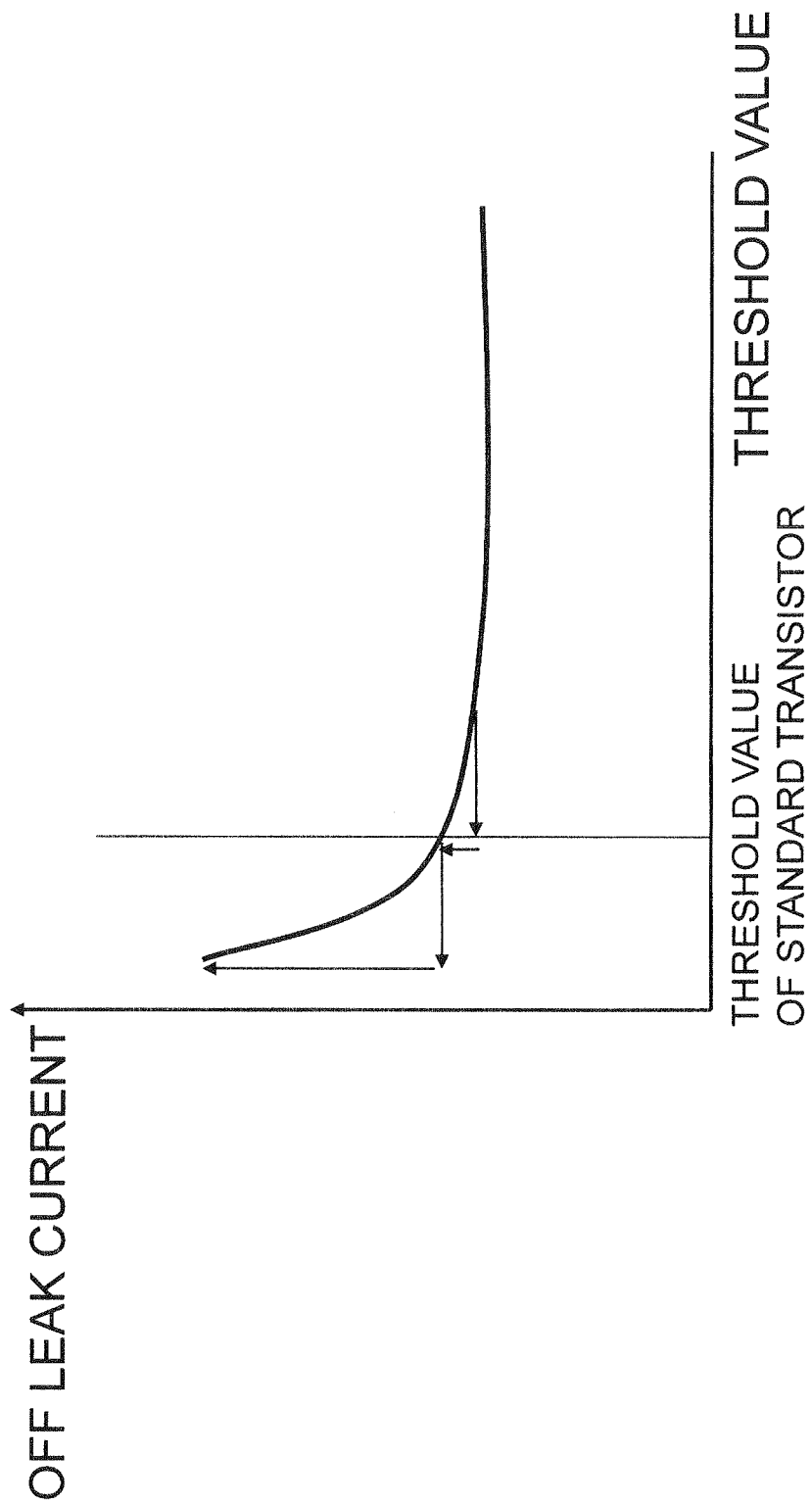
FIG. 4 is a diagram schematically illustrating an example of a relation between the threshold value and an off-leak current.

FIG. 4 is a diagram schematically illustrating an example of a relation of the off-leak current with respect to the threshold value. As obvious from FIG. 4, the off-leak current rises exponentially as the threshold value becomes smaller. A tendency of the off-leak current in FIG. 4, when the transistor is in the OFF-state and when a voltage of the power source is applied to between the source and the drain, occurs because the leak current exponentially flows to a potential barrier at a source end. It is therefore said that the off-leak current does not considerably rise even by reducing the gate length of the transistor having a comparatively high threshold value. The present manufacturing method puts the focus on this characteristic of the off-leak current. Note that the transistor having the deep threshold value and the high threshold voltage may be said to be, in other words, a transistor having the deeper threshold value than the threshold value of a standard transistor presumed in design or having the higher threshold voltage.

In this connection, it follows that the off-leak current in the case of reducing the gate length of the standard transistor or the transistor having a still lower threshold value than the threshold value of the standard transistor takes a value that is large enough to be unignorable. This type of off-leak current characteristic is a cause of a limitative effect due to the rise in off-leak current in the case of uniformly reducing the gate length.

The present manufacturing method takes the following processes.

(1) A "critical path" i.e., a "speed path" is identified.

(2) A layout analysis with respect to an element (which is also termed a circuit element) or a component on the identified critical path is performed, and the transistor having the deeper (larger) threshold value than the threshold value of the standard transistor, is extracted.

(3) The layout is changed so as to reduce the gate length in the way of being targeted at the transistor having the deeper (larger) threshold value than the threshold value of the standard transistor.

(4) The integrated circuit is manufactured based on the thus-changed layout.

As a result of the processed described above, the threshold value is decreased by reducing only the gate length of the transistor having the deeper threshold value than the target threshold value or the threshold value of the standard transistor. Accordingly, it is feasible to manufacture the integrated circuit exhibiting the increased circuit operation speed while restraining the rise in off-leak current, i.e., the rise in power consumption to the greatest possible degree.

First Working Example

Figure 5:
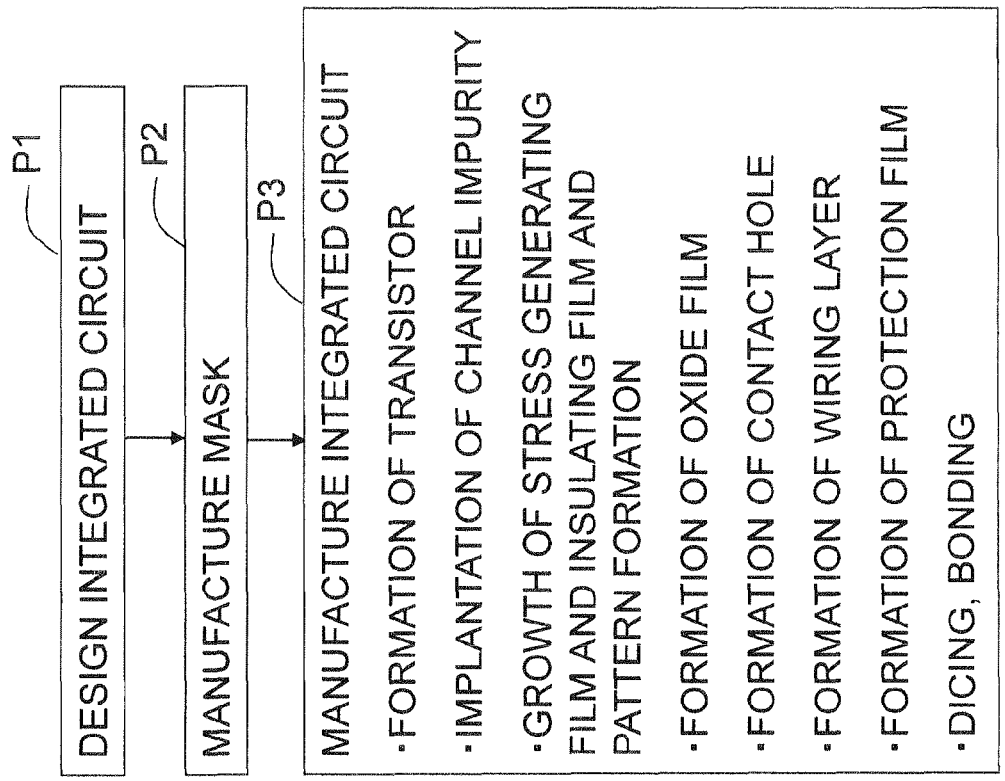
FIG. 5 is a diagram illustrating an example of a flow of processes of an integrated circuit manufacturing method according to a first working example.

A manufacturing method of the integrated circuit according to a first working example will be described with reference to FIGS. 5 through 17. FIG. 5 illustrates an example of processes of the integrated circuit manufacturing method according to the first working example. The manufacturing method includes a design process (P1) of the integrated circuit, a mask manufacturing process (P2) based on the designed chip data and an integrated circuit manufacturing process (P3) which includes patterning by use of the manufactured mask. In these processes, the integrated circuit design process includes a step of determining a connection relation of the elements within the integrated circuit, a step of laying out the elements in the chip according to the connection relation, a step of adjusting inter-element signal propagation timing with respect to the design data of the post-layout integrated circuit, a step of adjusting the threshold value (ON current) through the adjustment of the gate length of the transistor, and a step of outputting the design pattern containing a shape when exposed with respect to the timing-adjusted design data.

Further, the mask manufacturing process (P2) is a process of manufacturing the mask for exposure by forming a transparent region via which the light is transmitted onto a mask substrate and a shield region that does not admit the light by performing pattern rendering, developing, etching, etc in a way that uses electron beams, laser beams, etc. The transparent region or the shield region is manufactured by forming a design a pattern output in the integrated circuit design process on the mask substrate (which is also called a reticle substrate).

Moreover, the integrated circuit manufacturing process (P3) includes steps of forming an oxide film on the semiconductor substrate, forming a resist pattern by use of the exposure mask, implanting an impurity into the semiconductor substrate, forming a conductive film, and etching after forming the resist pattern. Through these steps, the transistor is formed on the semiconductor substrate, a channel impurity is implanted, the transistor taking the laid-out configuration in the integrated circuit design, i.e., including the gate having the gate length adjusted in the process P1 is formed, and other elements are formed. Furthermore, a wire connected to the element and a plug for connecting the element to the wire are provided by forming a stress occurrence film (DSL (Dual Stress Liner) film etc), an insulating film such as the oxide film etc, a contact hole and a wiring layer. Moreover, the semiconductor device is manufactured through steps of forming a protection film, dicing, bonding, and so on.

<Configuration of Design Support Device>

Figure 6:
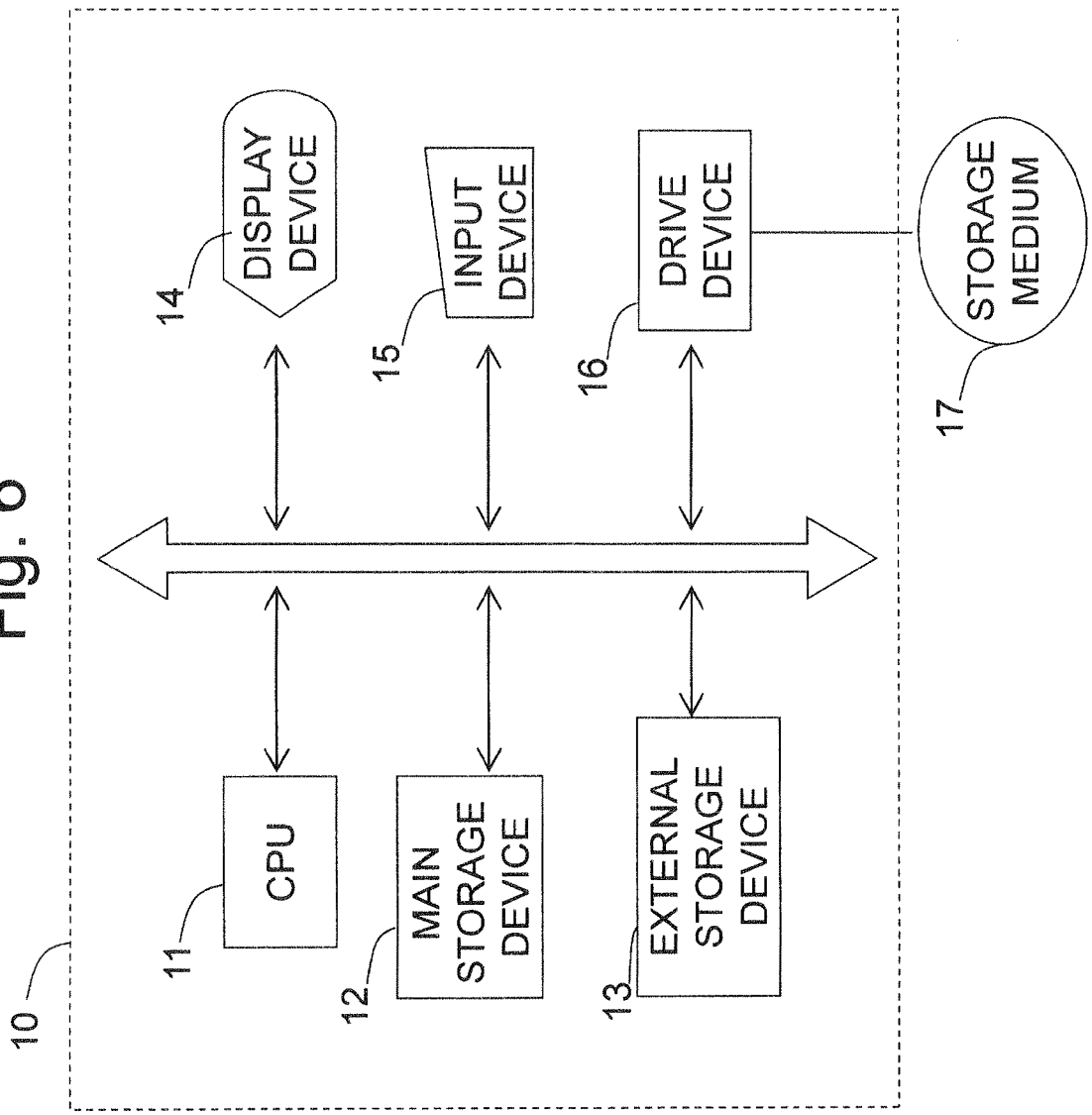
FIG. 6 is a diagram illustrating an example of a hardware configuration of a design support device used in a design process of the integrated circuit.

FIG. 6 illustrates an example of a hardware configuration of a design support device 10 employed in the integrated circuit design process. The design support device 10 has a CPU 11, a main storage device 12, an external storage device 13, a display device 14, an input device 15 and a drive device 16.

The CPU 11 executes a computer program deployed in an executable manner on the main storage device 12, thus providing functions of the design support device 10. The CPU 11 may include a plurality of CPUs without being limited to a single-core CPU.

The main storage device 12 stores the computer program executed by the CPU 11, the data etc processed by the CPU 11 and so on. The main storage device 12 may include a non-volatile ROM (Read Only Memory) and a volatile DRAM (Dynamic Random Access Memory).

The external storage device 13 is exemplified such as a hard disk driven by a hard disk drive, and a solid-state drive (SSD) using a flash memory. The external storage device 13 stores the computer program deployed on the main storage device 12 or the data processed by the CPU 11.

The display device 14 is exemplified by a liquid crystal display, an electroluminescence panel, etc. The input device 15 is an input device such as a keyboard, a mouse, a touch panel and an electrostatic pad etc. The electrostatic pad is a device used for detecting a user's operation of tracing a flat pad with a finger and controlling a position and a moving status of a cursor on the display in accordance with the user's operation. For instance, a motion of the finger of the user is detected from a change in electrostatic capacity of an electrode under the flat pad.

The drive 16 provides a function of executing at least one of writing the data and reading the data to and from the storage medium 17. The drive 16 may, however, be a drive which executes both of writing the data and reading the data. The storage medium 17 is exemplified such as a CD (Compact Disc), a DVD (Digital Versatile Disk), a Blu-ray disc and a flash memory card.

Moreover, though not illustrated in FIG. 6, the design support device 10 can also establish a connection of the communication unit capable of performing the communications with other computers on the network. The communication unit is also called a NIC (Network Interface Card). The communication unit is, e.g., an interface of a LAN (Local Area Network). Then, the design support device 10 supports the manufacture of the mask by performing the communications with the computer at a site where the mask manufacturing device is installed via the communication unit. Furthermore, the design support device 10 supports the manufacture of the semiconductor device by performing the communications with the computer at the site where the semiconductor manufacturing device getting involved in a wafer process is installed via the communication unit.

Note that FIG. 6 illustrates an example of a single computer as the design support device 10. The design support device 10 may also, however, be a system including a plurality of computers which execute the processes on a process-sharing basis in linkage with each other.

<Explanation of Design Data>

Figure 7:
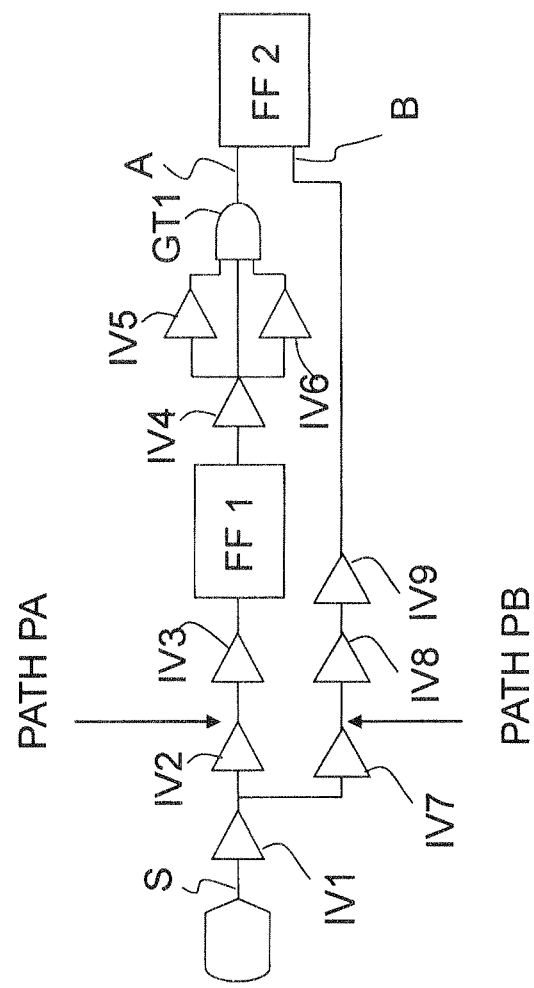
FIG. 7 is a diagram illustrating an example of data after making a logical design.

FIG. 7 illustrates an example of the data after a logical design. The data after the logical design in FIG. 7 contains a portion of the integrated circuit including two paths such as a path PA and a path PB.

The path PA is a path extending from a start point S via inverters IV1, IV2 a flip-flop FF1, inverters IV3, IV4, IV5 and an AND gate GT1 and ending with an end point A having an input to a flip-flop FF2. Further, the path PB is a path extending from the start point S via inverters IV1, IV7, IV8, IV9 and ending with an end point B having an input to the flip-flop FF2.

Thus, the design data is described by data representing a type of the transistor and terminals possessed by the transistor, a net list defined as wire connection information between the terminals of the transistor, and information representing a wiring characteristic between the terminals of the transistor. Namely, in FIG. 7, it is assumed that there is inputted the design data of the integrated circuit which includes the wiring characteristic between the terminals in addition to the types of the elements within the integrated circuit, the terminals of the elements, and the connection information defining the connection relation between the terminals.

For example, the net list as the connection information between the elements is generated by the logical design of the integrated circuit. Based on the generated net list and data of a cell library of the elements, a layout tool of the integrated circuit generates the layout data of the integrated circuit. The element in the cell library is a circuit component including the transistor, corresponding to, e.g., a logical gate circuit. Moreover, a circuit including a resistance and a capacitor can be exemplified as the element. Then, the net list including the wiring characteristics, e.g., a wire length, a line width, a resistance value, a floating capacity, and a floating inductance is generated by incorporating the information of the wiring pattern on the layout data into the net list.

<Design Process of Integrated Circuit>

Figure 8:
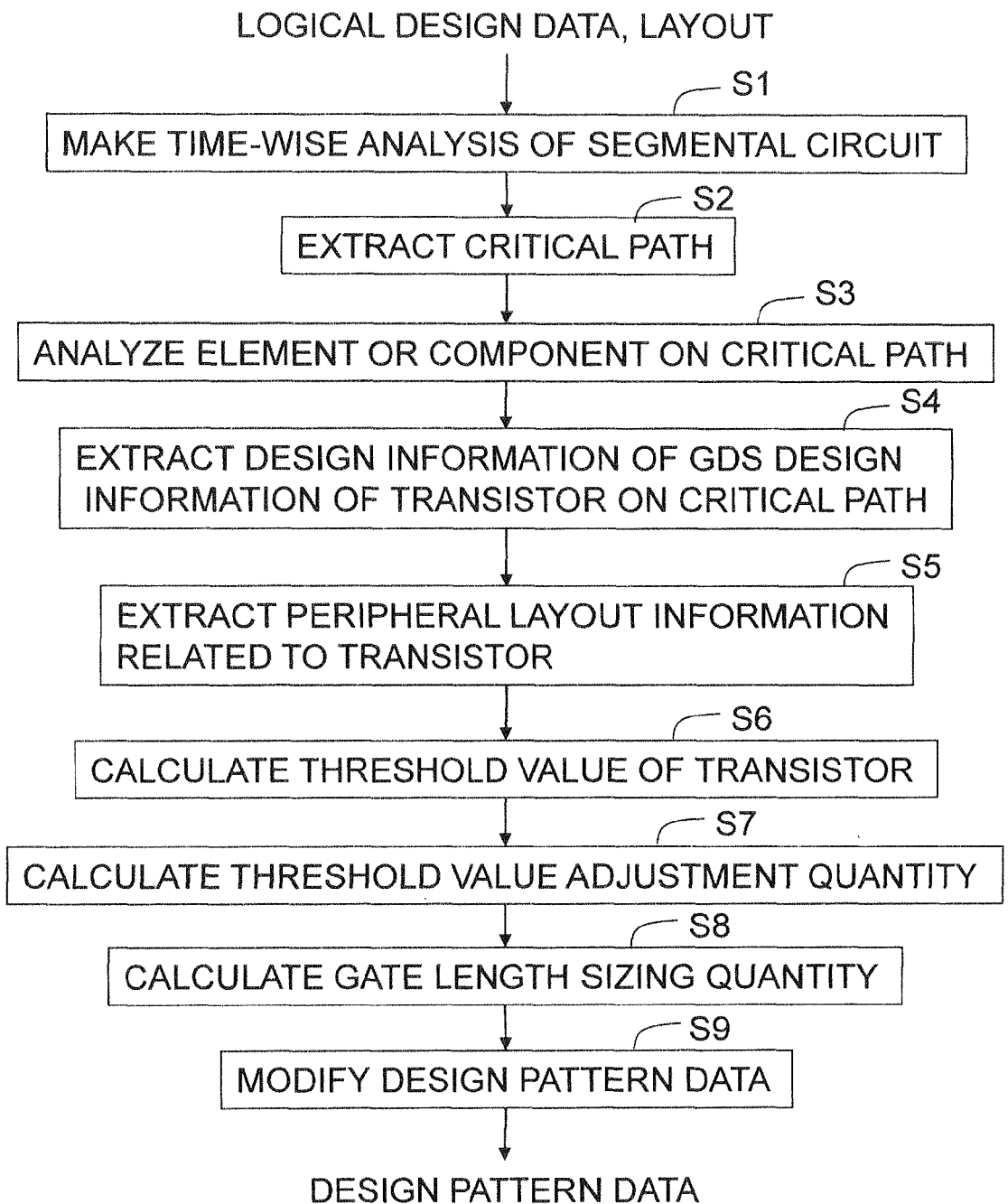
FIG. 8 is an example of a flowchart of processes when verifying the design and when adjusting the characteristics after making the logical design and a layout design of the integrated circuit.

FIG. 8 is an example of a flowchart of processes when verifying the designs after the logical design of the integrated circuit and the layout design and when adjusting the characteristics. The CPU 11 of the design support device 10 executes the processes in FIG. 8 on the basis of the computer program deployed on the main storage device 12. In this process, items of data inputted to the design support device 10 are the design data which describes the connection relation of the integrated circuit and includes attributes of the wires illustrated in FIG. 7 and the layout data.

The design support device 10, to begin with, makes a time-wise analysis for a segmental circuit on the basis of the design data (S1). Herein, the design support device 10 extracts the segmental circuit in which a plurality of paths exists from within the design data. Then, the design support device 10 calculates a difference between periods of signal propagation time in the plurality of paths within each segmental circuit.

Figure 9:
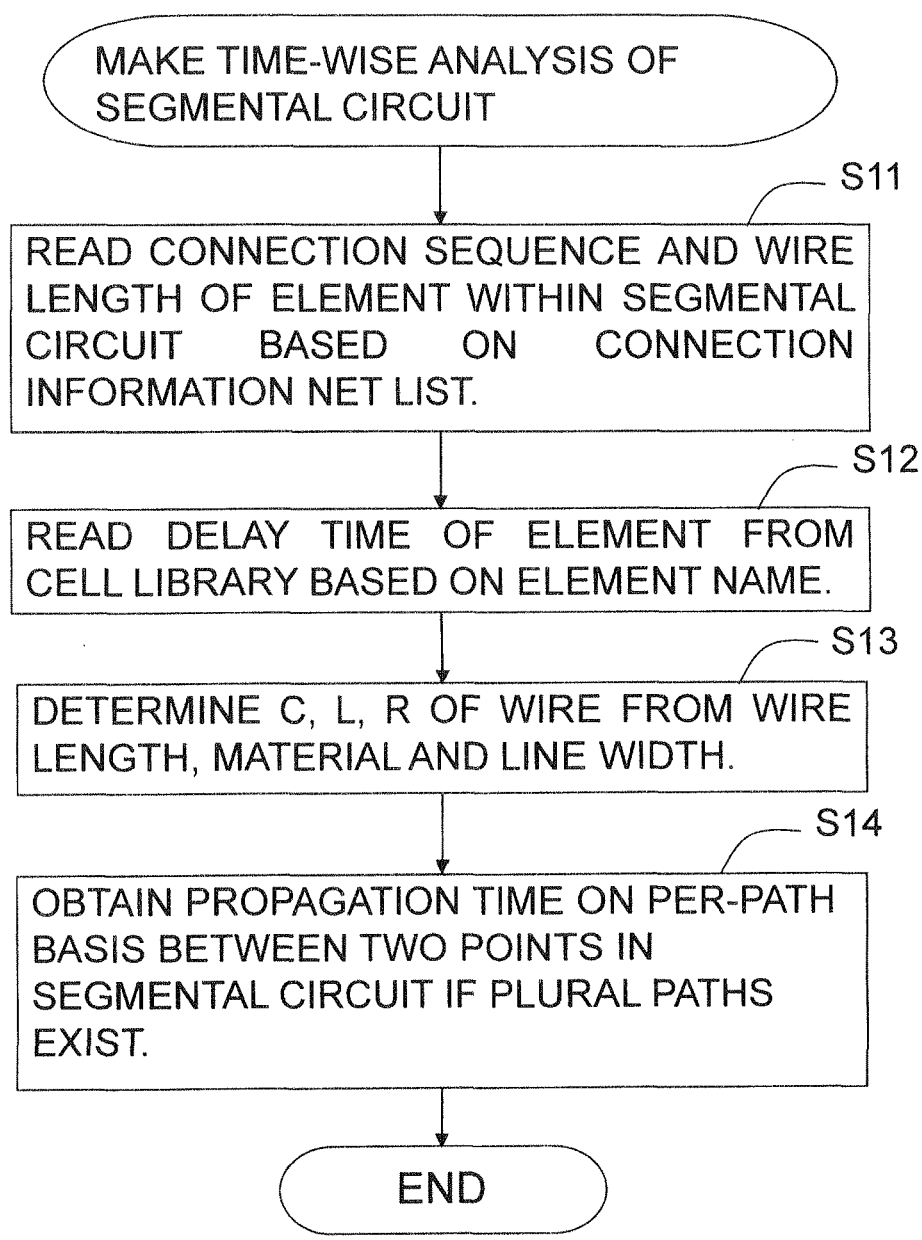
FIG. 9 is a diagram illustrating an example of a time-wise analysis process for a segmental circuit.

FIG. 9 illustrates an example of a process of the time-wise analysis for the segmental circuit. In this process, the design support device 10 reads, based on the connection information of the net list, a connection sequence of the elements within the segmental circuit and the wire attributes (corresponding to signal propagation characteristics of a transmission path) (S11). The wire attributes contain a wire length, a material having a resistivity etc, a line width and so on. Next, the design support device 10 reads, based on an element name, a delay time (corresponding to the signal propagation characteristic) of the element from the cell library (S12). The element is exemplified such as the transistor, the resistance, the capacitor, a logic gate and, further, the flip-flop. Then, the design support device 10 determines the floating capacity, the floating inductance, the resistance value, etc of the wire from the wire length, the material, and the line width (S13). Then, the design support device 10, if the plurality of paths exists between the two points within the segmental circuit, obtains the signal propagation time on a per-path basis (S14).

Figure 10:
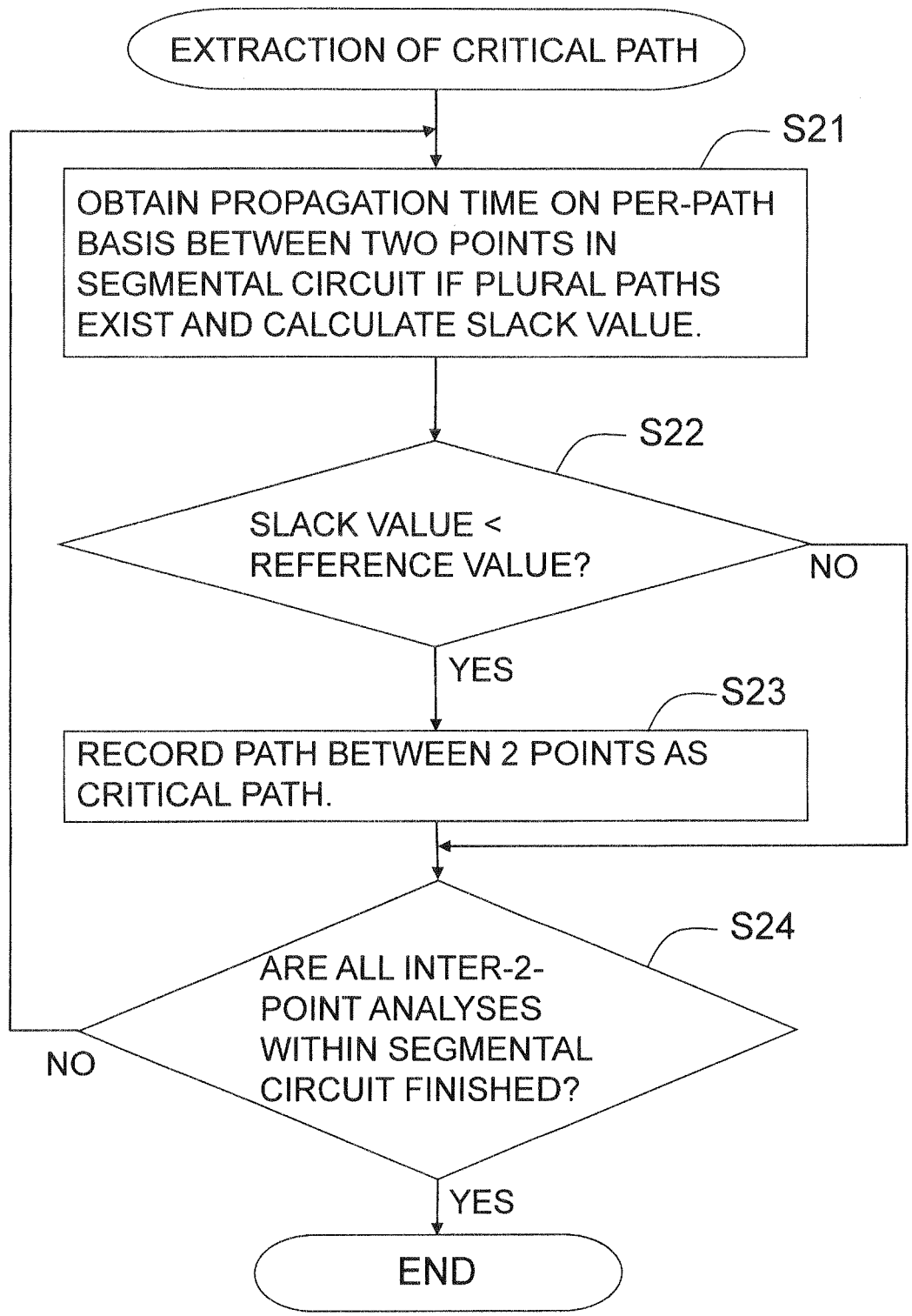
FIG. 10 is a diagram illustrating an example of details of a process of extracting a critical path.

Next, the design support device 10 extracts the critical path (corresponding to a target path) (S2 in FIG. 8). FIG. 10 illustrates an example of details of the process of extracting the critical path. In this process, the design support device 10, if the plurality of paths exists between the two points within the segmental circuit, obtains the signal propagation time on the per-path basis, and calculates a slack value (S21). The signal propagation time between the two points can be obtained in the procedures illustrated in FIG. 9. Further, the slack value can be said to be a degree of allowance for the reference value on which a timing error occurs.

The slack value of setup in which a setup error occurs in the segmental circuit of FIG. 7 can be defined as follows. For example, the setup slack value of the path extending from the flip-flop FF1 to the flip-flop FF2 is acquired by:

Setup Slack Value=min($DB-DA$)+$T-C$ where DA is a delay time of the path PA leading to the terminal A of the flip-flop FF2 via the flip-flop FF1 from a clock source S, and DA is a delay time of the path PB leading to the terminal B from the clock source S. Herein also, T is a clock period, and C is a constant. The paths PA and PB are exemplifications, and the slack value is calculated for each of the plural paths between the two points. In the following discussion, the description using the paths PA and PB is made by way of a typical example, however, the slack value is to be calculated for each of the plural paths between the two points.

For example, if the setup slack value is a negative value, it can be determined that the setup error occurs. Further, if the setup slack value is a non-negative value, it is determined that the setup error does not occur. Namely, "min(DB−DA)" is negative, and hence, if a difference in delay time between the paths does not exceed the clock period, it can be determined that a breach of the setup time is not caused.

Furthermore, according to STA (Static Timing Analysis), the slack value is acquired from the following formula by using a maximum delay time Da_max of the path PA and a minimum delay time Db_min of the path PB.

Setup Slack Value=$Db\_min-Da\_max+T-C$;

Further, a hold slack value of the path leading to the flip-flop FF2 from the flip-flop FF1 is acquired from the following formula by employing the minimum delay time Da_min of the path PA and the maximum delay time Db_max of the path PB.

Hold Slack Value=$Db\_max-Da\_min T-C$;

Next, the design support device 10 determines whether or not the slack value is less than the reference value (S22). Then, if the slack value is less than the reference value, the design support device 10 records the path between the two points as the critical path (S23).

Then, the design support device 10 determines whether or not the analysis is finished with respect to all of the 2 points within the segmental circuit (S24). Subsequently, if the 2 points undergoing none of the analysis exist within the segmental circuit, the design support device 10 loops the control back to S21. Through the procedures described above, it is possible to detect the critical path on which should be taken steps within the segmental circuit.

Note that in the case of setting the reference value to "0" in the determination in S22, there is detected the critical path in which the setup error or the timing error such as the hold error is assumed to occur. The process in FIG. 10 is not necessarily, however, limited to the extraction of the critical path in which the setup error or the hold error is assumed to occur. Namely, the reference value is set to a positive value, thereby making it possible to extract the path between the 2 points with the slack value approximate to the reference value in regard to the paths in which neither the setup error nor the hold error is determined to occur according to the conventional standard. Then, the extracted path is adjusted as the critical path, whereby a much larger allowance for the timing error can be given to between the 2 points.

Next, the design support device 10 analyzes the element or the component on the critical path (S3 in FIG. 8). More specifically, identifying information, e.g., the element name of the element connected onto the critical path is extracted from the design data. As a substitute for the element name, there may be used a cell name of the cell defined as an aggregation of the components representing the elements. Incidentally, the cell is called a structure, and the cell name is called a structure name. Then, the design support device 10 identifies a device type or a transistor of which a dimensional adjustment is inhibited. The device type is stored in a table containing a definition of how the element is associated with the device type, and reference to this table may be made. Further, with respect to the transistor of which the dimensional adjustment is inhibited, a table store a relation between the element name and the transistor of which the dimensional adjustment is inhibited, and the reference to the table may be made. The transistor of which the dimensional adjustment is inhibited may also be identified by use of a region or a layer number in the layout data. An example of the process of identifying the transistor of which the dimensional adjustment is inhibited by use of the region or the layer number in the layout data, will be separately described in a fourth working example.

Then, the design support device 10 extracts the layout pattern of the cell about the transistor in the elements on the critical path (S4). The layout pattern of the cell is graphic data containing a polygon representing a shape of the transistor or a line with a width. A process of extracting the layout pattern may involve executing a check called an LVS (Layout Versus Schema) check between the connection information of the circuit and the layout information thereof. For instance, the layout pattern in the design data is generated from the connection information and the cell library. When generating the layout pattern, a relation between the connection information and the layout pattern may be recorded. Then, the layout pattern corresponding to the element defined by the connection information may be acquired.

Figure 11:
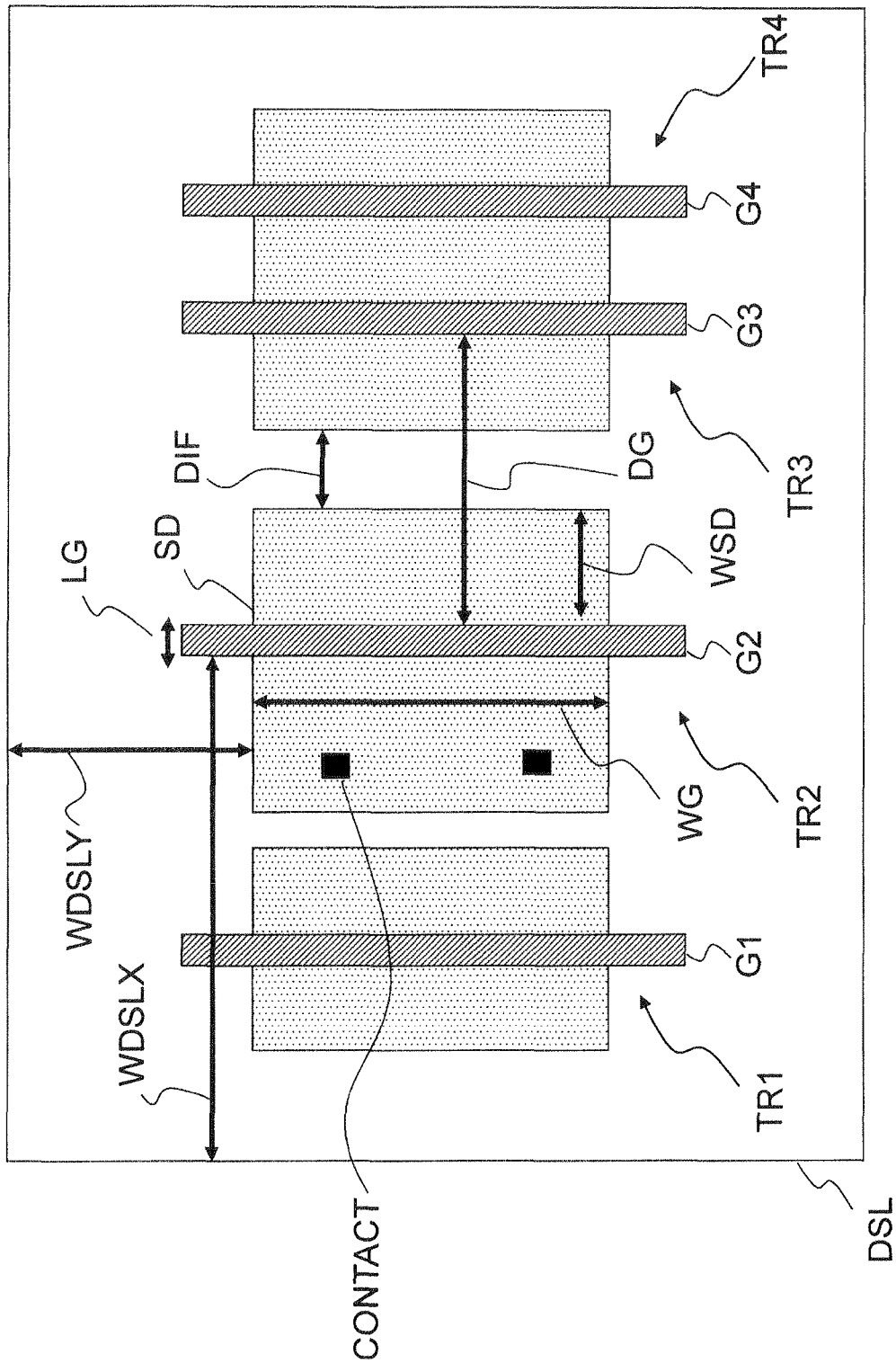
FIG. 11 is a diagram illustrating an example of peripheral layout information together with a layout pattern of a cell of a transistor.

Next, the design support device 10 extracts the parameter of the peripheral layout pattern of the transistor from the layout pattern of the cell. The parameter of the peripheral layout pattern corresponds to a parameter which characterizes at least a part of the design pattern shape. FIG. 11 illustrates an example of the peripheral layout information together with the layout pattern of the cell of the transistor. The peripheral layout information of the transistor can be said to be a typical value of the dimension of the transistor. In the example of FIG. 11, the peripheral layout information is exemplified by items of information such as a gate length (LG) of the transistor, a width (SD width, WSD) of the active region from a gate edge other than the gate width (LW), a width (DIF) of an element insulating region up to a neighboring active region, a covering quantity (WDSLX, WDSLY) of a stress liner film DSL, a space (DG) up to a neighboring gate, a contact count, and a distance between the contact and the gate. On the occasion of extracting the parameters, these parameters can be also extracted by logically processing the layout data for each of the gate layer, the active layer, the DSL liner layer, and the contact layer. The layout data is also called design pattern data and is the data for designating the shape of the circuit or the shape of the element by patterns such as the polygon and the line with the width. Note that FIG. 11 is an illustration including not the single transistor but four transistors TR1-TR4 corresponding to four gates G1-G4.

Figure 12:
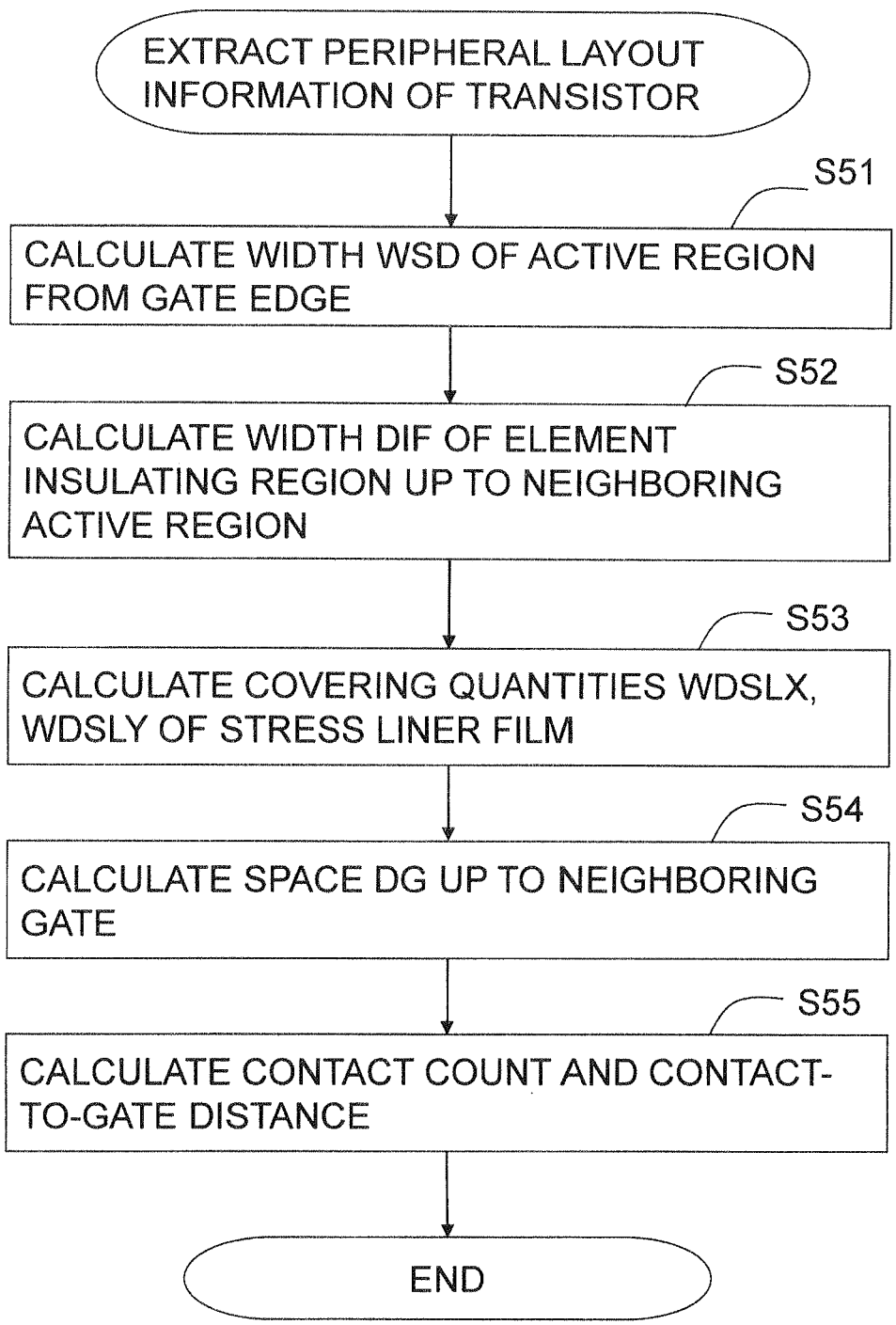
FIG. 12 is a diagram illustrating an example of a process of extracting the peripheral layout information of the transistor.
Figure 13:
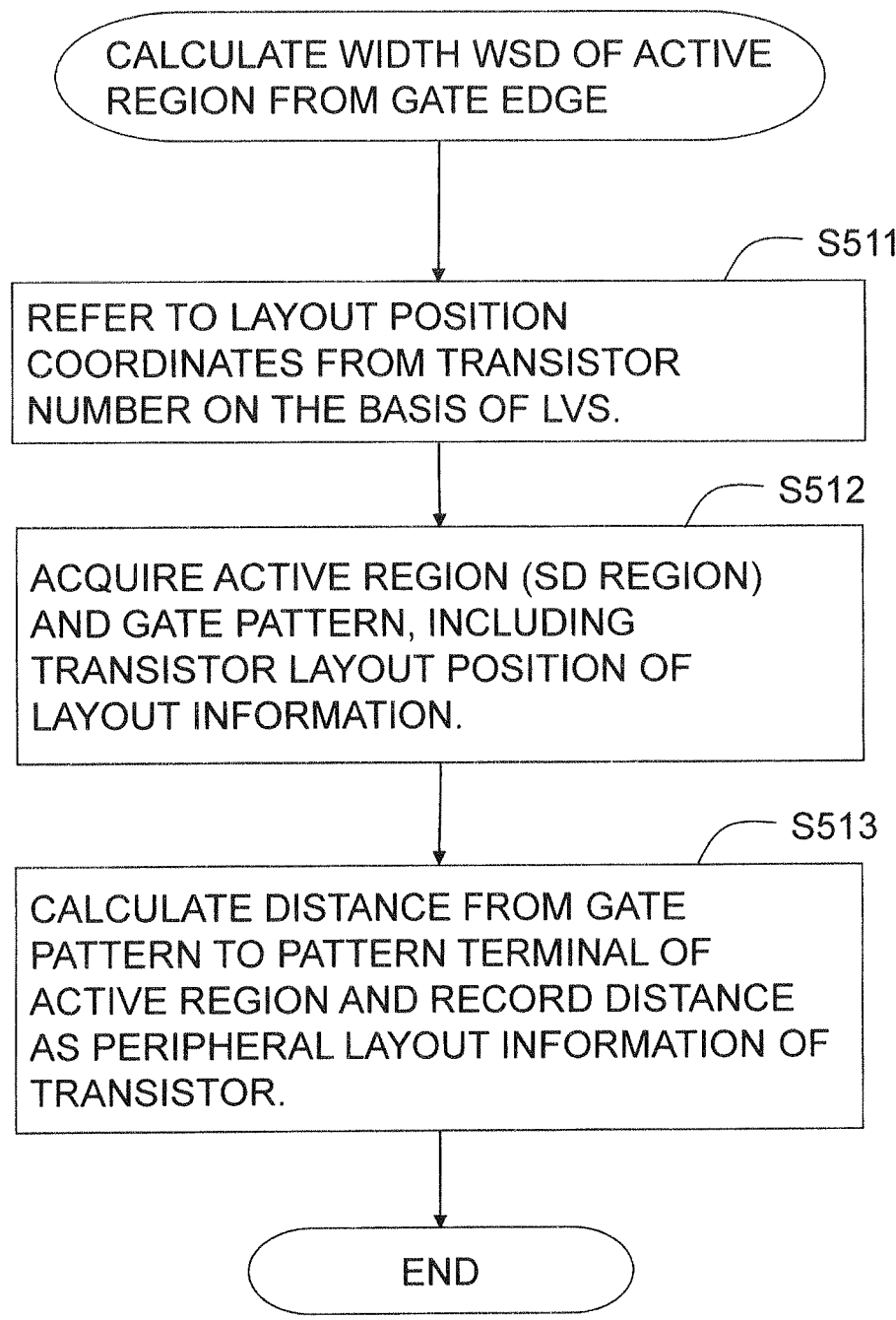
FIG. 13 is a diagram illustrating an example of details of a process of calculating an active region width from a gate edge.

FIG. 12 illustrates an example of a process (details of S5 in FIG. 8) of extracting the peripheral layout information of the transistor. In this process, the design support device 10 calculates the width WSD of the active region from the gate edge (S51). FIG. 13 illustrates an example of details of a process of calculating an active region width from the gate edge.

In this process, the design support device 10 is based on such a premise that the LVS check is completed and the reference to the associated relation between the connection information and the layout pattern can be made. The design support device 10 refers to the layout position coordinates from the transistor number through the LVS check (S511).

Next, the design support device 10 acquires the patterns of the active region (SD region) and the gate, which include the transistor layout positions of the layout information (S512).

Subsequently, the design support device 10 calculates the distance WSD from the gate pattern to the end of the pattern of the active region, and records the distance WSD as the peripheral layout information of the transistor (S513). The active region and the gate pattern are defined on an identification-enabled basis by use of, normally, a different (unique) layer number. Accordingly, the design support device 10 can calculate the distance WSD by executing, e.g., Subtract between the pattern specified by the layer number which designates the pattern of the active region and the pattern specified by the layer number which designates the gate pattern and calculating the dimensions of the remaining patterns.

Note that the regions and gates can be also narrowed down to one active region and one gate by specifying the analysis target transistor. For example, the cell (structure) is generated on a per-transistor basis, the cell name (structure name) may be identified. Moreover, the analysis target transistor may also be specified by extracting the patterns within a predetermined distance from the coordinates of the center of the gate. The transistor narrow-down procedures can be similarly applied to the processes which follow.

Next, referring back to FIG. 12, the discussion continues. The design support device 10 calculates the width DIF of the element insulating region up to the neighboring active region (S52). This process can be also realized by the logical calculation of the pattern which defines the layout pattern of the transistor in the same way as in the case of FIG. 12. For instance, the design support device 10 reads the pattern specified by the layer number associated with the active region, and executes a reverse calculation (black-and-white reversion) for reversing the pattern existing region. As a result, a pattern of a portion interposed between the active regions is generated. Then, a width of the gate of the pattern in a lengthwise direction, which is generated by the reverse calculation, may simply be calculated.

If the active region is, e.g., the aggregation of the rectangles as in FIG. 11, however, the calculation can be further simplified. In this case, the plurality of active regions is arranged in the lengthwise (LG) direction of the gate. Such being the case, the design support device 10 reads the pattern specified by the layer number associated with the active region, and performs sorting based on the reference coordinates (e.g., coordinates of a left lower corner or the coordinates of the center) of the rectangle. Then, a distance between the rectangles adjacent to each other may be calculated.

Next, the design support device 10 calculates the covering quantities WDSLX, WDSLY of the stress liner film DSL (S53). This process can be also realized by the logical calculation of the pattern which defines the layout pattern of the transistor in the same way as in the case of FIG. 12. For example, the design support device 10 subtracts the pattern specified by the layer number associated with the active region from within the pattern specified by the layer number associated with the stress liner film DSL within the analysis target transistor.

Then, the design support device 10 calculates a dimension in the gate widthwise (WG) direction in the pattern given as a result of being subtracted and may set the dimension to WDSLY. Further, a distance from the gate of the focused transistor up to a side of the pattern specified by the layer number associated with the stress liner film DSL is calculated and may be set to WDSLX.

Next the design support device 10 calculates the space DG up to the neighboring gate (S54). The design support device 10 reads the pattern specified by the layer number associated with the gate layer, and performs sorting based on the reference coordinates (e.g., the coordinates of the left lower corner or the coordinates of the center) of the rectangle. Then, a distance between the rectangles adjacent to each other in the lengthwise (LG) direction of the gate may be calculated.

Subsequently, the design support device 10 calculates the contact count and the distance between the contact and the gate (S54). The design support device 10 reads the pattern specified by the layer number associated with the contact hole layer, and may count the number of rectangles. Moreover, the design support device 10 reads the pattern within the analysis target transistor on the basis of the pattern specified by the layer number associated with the gate layer. Normally, one pattern corresponding to the gate of one transistor is extracted. Then, the distance between the gate and the pattern representing the contact may be obtained. As in FIG. 11, the plurality of gates exists, in which case the distance from each pattern to the gate may be obtained.

Figure 14:
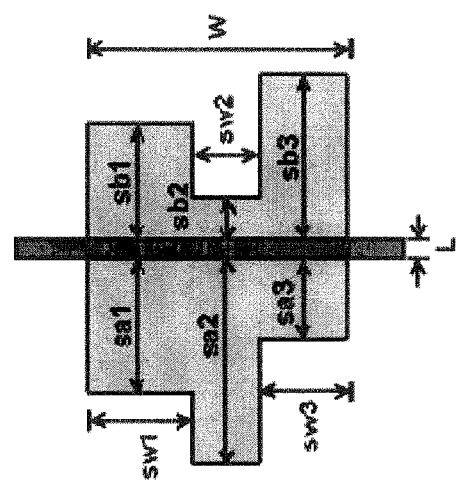
FIG. 14 is a diagram illustrating an example of a transistor having stepped portions in the active region and the peripheral layout information.

Further, in the case of the transistor having stepped portions in the active region as in FIG. 14, the width and the distance are extracted for each of the edges configuring the stepped portions. In FIG. 14, three stepped portions having lengths sa1, sa2, sa3 are defined by the length L and the width W of the gate and are provided along the lengthwise (L) direction of the gate on the left side of the gate, in which the three stepped portions have respective widths sw1, sw2, sw3 of the lengthwise portion (i.e., in the lengthwise direction). Furthermore, on the right side of the gate, three stepped portions having lengths sb1, sb2, sb3 are provided and have the widths sw1, sw2, sw3 of the lengthwise portion. In this case, as given in a mathematical expression 1, an effective length of the plurality of stepped portions may also be acquired by seeking an average weighted by the widths in the directions orthogonal to the lengths corresponding to the stepped portions. In a first formula of the mathematical expression 1, the lengths sa1, sa2, sa3 are weight-averaged by the respective widths sw1, sw2, sw3 of the lengthwise portion, thereby calculating an effective length SAeff. Further, in the second formula of the mathematical expression 1, the lengths sb1, sb2, sb3 are weight-averaged by the respective widths sw1, sw2, sw3 of the lengthwise portion, thereby calculating an effective length SBeff. Note that the number of the stepped portions is not "3" but is generalized to "n" (n-pieces of stepped portions).

[Mathematical Expression 1]
$$\frac{1}{SA_{\mathit{eff}} + 0.5 \cdot L_{drawn}} = \sum_{i=1}^{n} \frac{sw_i}{W_{drawn}} \cdot \frac{1}{sa_i + 0.5 \cdot L_{drawn}}$$
$$\frac{1}{SB_{\mathit{eff}} + 0.5 \cdot L_{drawn}} = \sum_{i=1}^{n} \frac{sw_i}{W_{drawn}} \cdot \frac{1}{sb_i + 0.5 \cdot L_{drawn}}$$

In next step, referring back to FIG. 8, the discussion continues. Next, the design support device 10 substitutes the parameters of the extracted peripheral layout information into a model formula for calculating the threshold value, which is prepared beforehand, and thus calculates a threshold value Vth of the transistor (S6). In stead of using the model formula, however, the threshold value Vth of the transistor may also be calculated by referring to a previously-prepared table for the calculation of the threshold value. Alternatively, there may be calculated a differential threshold value δVth from the standard transistor, which is determined by the combination of the gate length and the gate width. For example, the threshold value can be expressed in the following polynomial expression. A mathematical expression 2 exemplifies the model formula of the threshold value. Further, a mathematical expression 3 exemplifies the model formula of the differential threshold value. The model formula corresponds to a functional relation.

$Vth = f(LG, WG, WSD, WDSLX, WDSLY, DG)$ [Mathematical Expression 2]

where f is expressed by a polynomial expression using the gate length LG, the gate width WG, the source/drawing width WSD, the covering quantities (WDSLX, WDSLY) of the stress liner film DSL, the space (DG) up to the neighboring gate, the contact count, and the distance between the contact and the gate. The polynomial expression may be structured so as to include a term of the constant, first- or higher-degree terms of the respective parameters or a term of multiplying first- or higher-degree factors of different parameters.

Coefficients of the respective terms of the polynomial expression can be determined, e.g., from a relation between the parameters of the peripheral layout information of the actually-manufactured transistor and the actually-measured threshold values by use of a least square method or a multiple regression analysis. In this case, the coefficient of the term affecting the threshold value Vth to a small degree takes an extremely small value and is substantially "0". Further, the relation between the parameters of the peripheral layout information and the threshold values is modeled in the table, in which case the threshold value associated with the parameter value of the peripheral layout information may be complemented from the relation between the parameter value of the peripheral layout information at the 2 points and the threshold value in the table. It may be considered that the table corresponds to the functional relation.

$\delta Vth = g(WSD, WDSLX, WDSLY, \ldots)$ [Mathematical Expression 3]

where g can be expressed by a polynomial expression of the parameters of the peripheral layout information excluding the gate length LG and the gate width WG. The procedures of determining the coefficient δVth are the same as in the mathematical expression 2.

Obtained then is the target threshold value Vth0, or the threshold value Vth calculated as the differential threshold value δVth0 from the target standard transistor, or a difference (a threshold value adjustment quantity ΔVth) of the differential threshold value δVth from the standard transistor (S7). It should be noted that the threshold value of the target standard transistor corresponds to a reference threshold value. The model formula of the mathematical expression 3 does not, however, entail setting the threshold value of the present design target transistor to the reference value of the differential threshold value. For example, the threshold value of the transistor set as the standard transistor in the design library or the average value of the threshold values actually measured from the transistor manufactured in the predetermined semiconductor manufacturing process, may be set as the threshold value of the standard transistor.

Note that the mathematical expression 3 does not contain the parameters related to the gate dimensions such as the gate length LG and the gate width LW. When the values of the gate length LG and the gate width LW change, the relation between the parameter of the peripheral layout and the threshold value largely changes as the case may be. Accordingly, in the case of getting the model formula to include the parameters related to the gate dimensions such as the gate length LG and the gate width LW, it is difficult to define the relation between the parameter of the peripheral layout and the threshold value in the same model formula as the case may be. Then, as in the mathematical expression 3, a desirable format is that independent variables in the model formula do not contain the parameters related to the gate dimensions such as the gate length LG and the gate width LW. Therefore, in the case of defining the model formula, there is set the plurality of gate dimensions (corresponding to the parameters related to the dimensions of the gate) such as the gate length LG and the gate width LW, and the model formula may be defined on a per gate dimension basis. If described in the table also, the table may be generated on the per gate dimension basis.

Further, in the case of setting the plurality of gate dimensions such the gate length LG and the gate width LW and defining the model formula on the per gate dimension basis as in the mathematical expression 3, the functional relation may also be set in a way that sets the threshold value (i.e., the reference value) of the standard transistor with respect to the gate dimension and calculates the differential threshold value from the threshold value of the standard transistor. Namely, in stead of obtaining the functional relation between the value of the parameter and the threshold value, a relation between the value of the parameter and a differential value of the threshold value from the threshold value (reference value) of the standard transistor may also be acquired.

Figure 15:
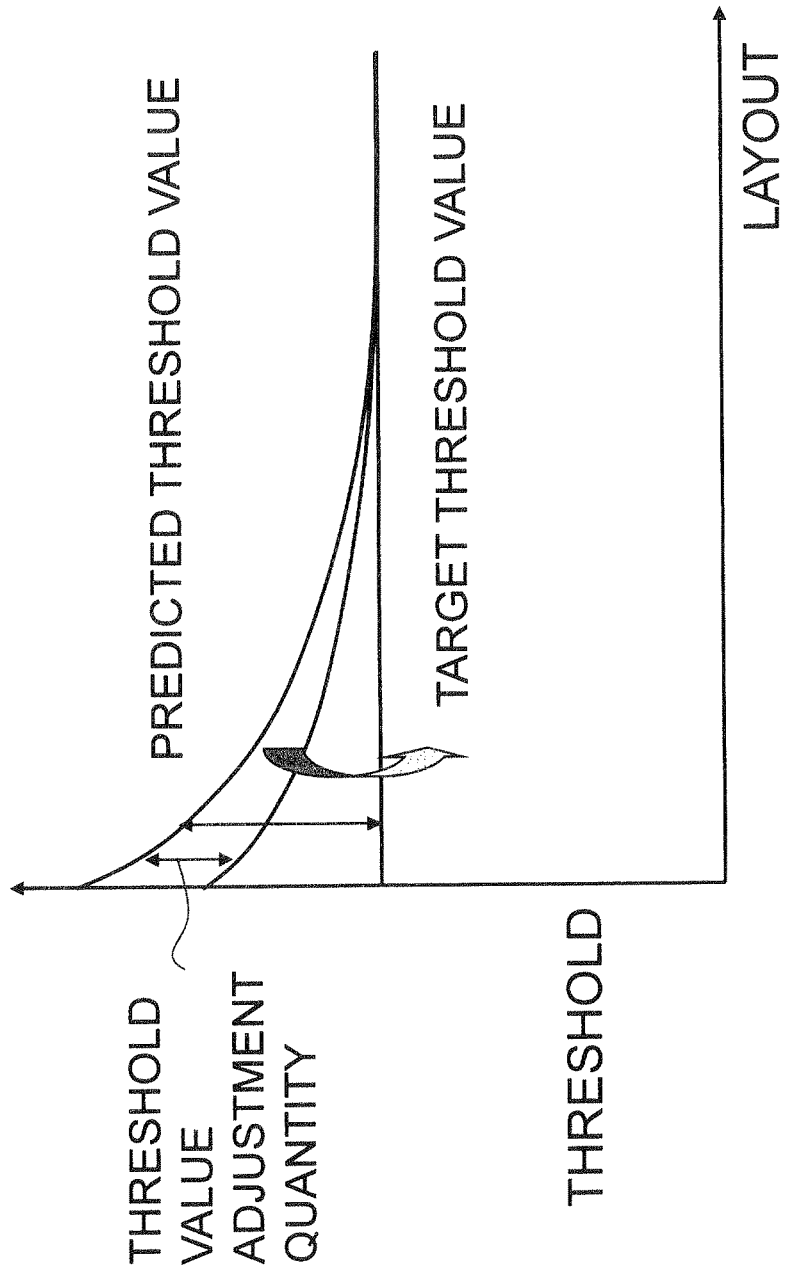
FIG. 15 is a diagram illustrating an example of a relation between a predicted threshold value acquired from a model formula and a target threshold value.

FIG. 15 illustrates an example of a relation between a predicted threshold value obtained from the model formula such as the mathematical expression 2 or 3 and the target threshold value. The predicted threshold value is a threshold value calculated from a model formula acquired based on a relation between the parameter of the peripheral layout information of the actually manufactured transistor and the actually measured threshold value. The predicted threshold value can be said to be a predicted threshold value of the threshold value that is attained in the case of manufacturing the transistor on the basis of the present peripheral layout information. On the other hand, the target threshold value is a threshold value set as the target at the design stage. The threshold value of the standard transistor assumed normally by the user (designer) may, however, be used as the substitute for the target threshold value. The use of the threshold value of the standard transistor enables the transistor having the deeper threshold value than the threshold value of the standard transistor to be set as the processing target transistor. In the first working example, the parameter is extracted from the peripheral layout information of the transistor, the operation speed of the transistor with a large deviation from the target threshold value is improved by attaining amelioration of the threshold value. Accordingly, the operation speed is improved by, for instance, decreasing the threshold value of the transistor having the slow signal propagation time on the critical path and increasing the ON current. As a result, for instance, the slack value on the critical path is further improved, thereby increasing the degree of allowance. On the other hand, the transistor of which the threshold value does not yet reach the target value or the threshold value of the standard transistor may not be set as the processing target transistor in the first working example. As a consequence, the threshold value can be ameliorated by narrowing the transistors down to the transistor enabled to restrain the rise in off-leak current.

Incidentally, in the case of model in which the types of the parameters of the peripheral layout information can be limited to a small number of types, a scheme is that the relation between the parameter of the peripheral layout information and the threshold value is table-formatted in place of using the model formula, whereby the threshold value Vth or the differential threshold value δVth may be obtained by interpolation.

Next, the design support device 10 calculates, with respect to each transistor, a sizing quantity of the gate length (corresponding to a change quantity of the gate length) corresponding to an improvement quantity ΔVh of the threshold value as in FIG. 15 (S8). In the process of S8, the threshold value adjustment quantity calculated in the process of S7 is substituted into a gate length sizing model formula prepared beforehand.

$$\Delta Vth = h(Lg, W, SD) \quad \text{[Mathematical Expression 4]}$$

In this step, it is feasible to avoid abnormally decreasing the gate length by setting a sizing upper limit on a per gate length basis beforehand.

Note that a relation between the threshold value adjustment quantity and the sizing quantity may be stored in a table (which is called a gate length sizing table). Then, the gate length sizing quantity required for controlling the threshold value adjustment quantity is obtained by referring to the gate length sizing table. In this case, a gate length sizing quantity corresponding to a desired threshold value adjustment quantity may be calculated by interpolation from the values of the threshold value adjustment quantities at the two points for narrowing down to the desired threshold value adjustment quantity. In this instance, it is sufficient that the gate length, the gate width, and the SD width are table-formatted or modeled. Namely, the interpolation-based calculation may be executed under the condition where the gate width and the SD width are specified.

Next, the design support device 10 modifies the gate dimension in the layout pattern of the transistor with the gate length sizing quantity and then outputs the thus-modified gate dimension (S9). A dimension changing process is a process called a sizing process, a dimension shift process, and a resizing process in the pattern calculation, and is generally executed by shifting the positions of the sides of the polygon data by predetermined quantities from the sides of the pattern.

After these modifications, the design support device 10 hands over the design pattern data to the control computer of a reticle manufacturing apparatus. The reticle manufacturing apparatus renders the design pattern data on a reticle (which is a glass substrate including a light shield portion such as a chrome surface) under the control of the control computer, thus manufacturing the reticle. The manufactured reticle is mounted on an exposure apparatus. In the exposure apparatus, a resist pattern is formed by transferring the on-reticle pattern onto a photo resist of a silicon substrate, thereby manufacturing chips on the silicon substrate via an etching process, etc.

Figure 16:
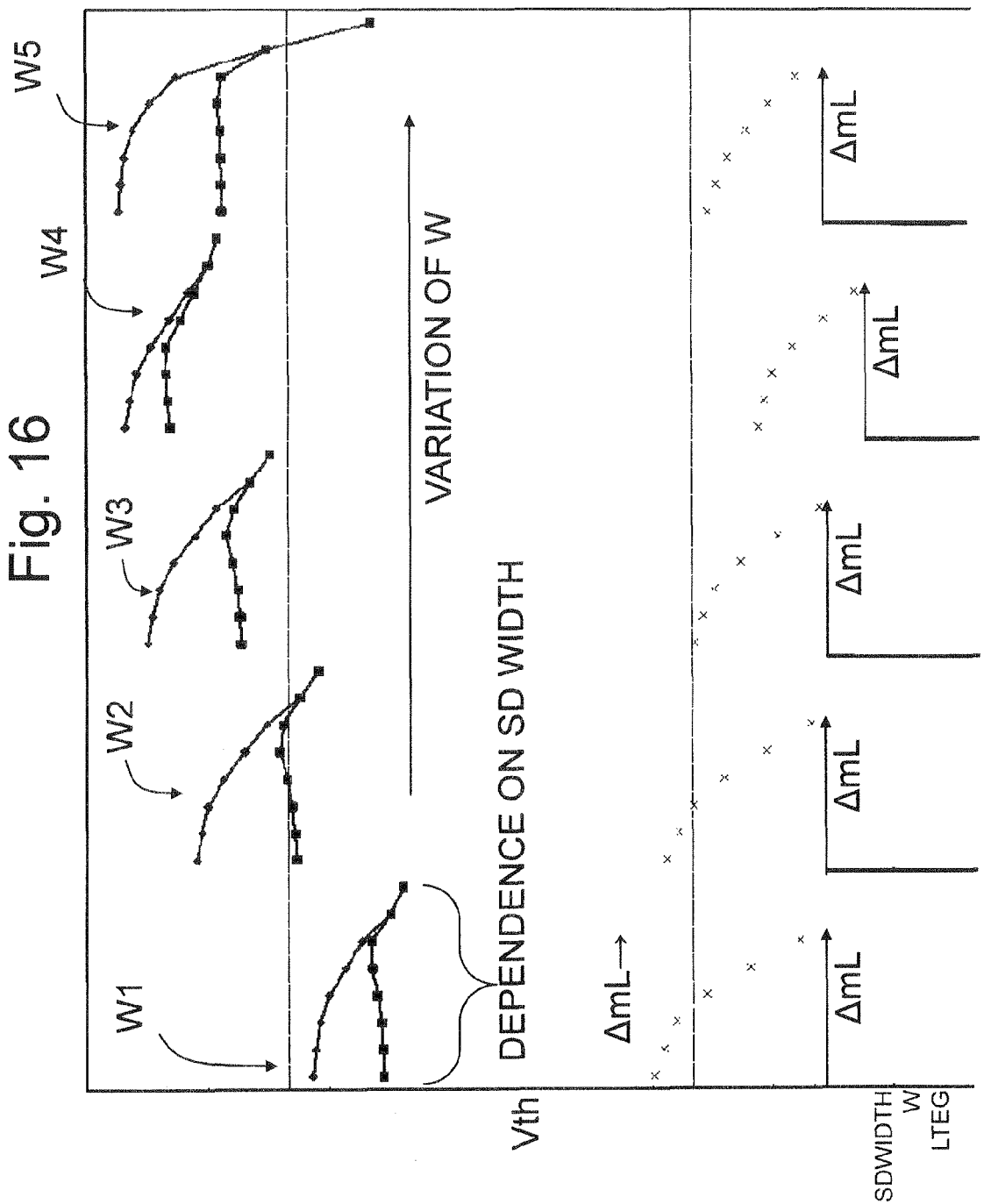
FIG. 16 is a diagram illustrating an example of characteristics of the threshold value of the transistor.

FIG. 16 illustrates an example of changes in characteristics of the threshold value of the transistor manufactured by the manufacturing method according to the first working example. FIG. 16 illustrates graphs W1-W5 indicating the measured results of the threshold value of the transistor of which the gate width is changed. The axis of abscissa represents the layout parameter. More specifically, the axis of abscissa represents the SD width WSD. Further, the axis of ordinates on the right side represents a reduction value ΔmL of the gate length. Moreover, the axis of ordinates on the left side represents the threshold value Vth.

Further, for example, in the graphs indicated by W1-W5, a mark "rhomboid" represents the threshold value in the case of not reducing the gate dimension for restraining the threshold value according to the integrated circuit manufacturing method in the first working example. On the other hand, a mark "rectangle" represents the measured result of the threshold value in the case of reducing the gate dimension for restraining the threshold value according to the integrated circuit manufacturing method in the first working example. Further, a mark "x" related to mL represents each reduction value of the gate dimension. As in FIG. 16, it is understood that the threshold value can be restrained by adjusting the gate length with respect to the transistors having the variety of gate widths and SD widths.

Figure 17:
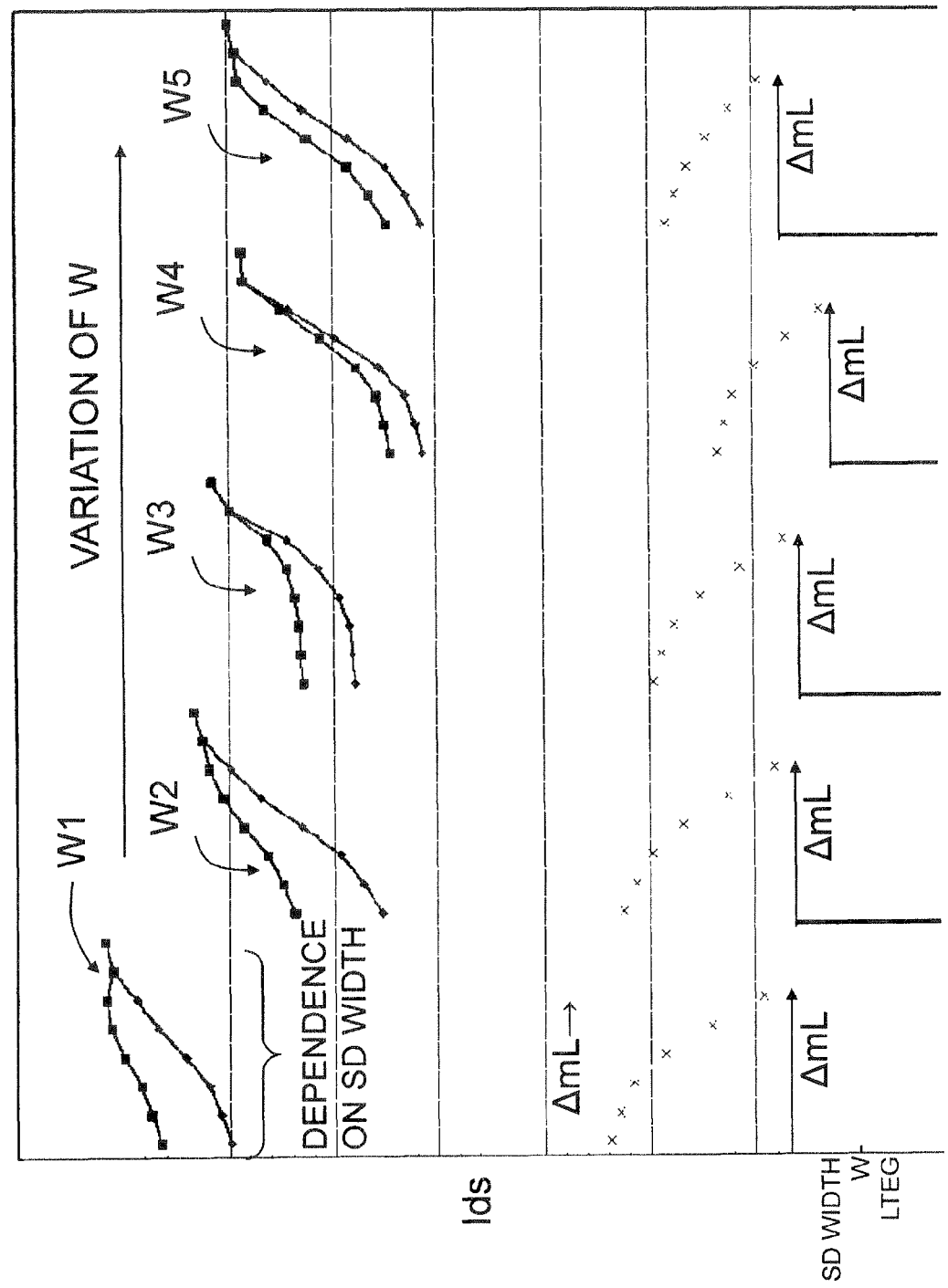
FIG. 17 is a diagram illustrating an example of a measured value of the ON-current of the transistor.

FIG. 17 depicts plotted measured values ids of the ON currents of the transistors manufactured under the same conditions as those in FIG. 16. In FIG. 17, however, depicts mark "rhomboid" represents the ON currents in the case of not reducing the gate dimension for decreasing the threshold value according to the integrated circuit manufacturing method in the first working example. On the other hand, the mark "rectangle" indicates the measured results of the ON currents in the case of reducing the gate dimension for decreasing the threshold value according to the integrated circuit manufacturing method in the first working example. As in FIG. 17, it is understood that the ON current can be increased by adjusting the gate length with respect to the transistors having the variety of gate widths and SD widths.

As discussed above, according to the integrated circuit manufacturing method in the first working example, the critical path within the integrated circuit is extracted from the connection information of the elements, the element signal propagation time information containing the layout pattern of the transistor in the elements, and the signal propagation time information of the wires for connecting the elements to each other. Then, the threshold value is calculated from the parameter of the peripheral layout information of the transistor on the critical path. Subsequently, the threshold value is decreased by adjusting the gate length of the on-the-critical-path transistor of which the threshold value is deeper than the target value so as to get approximate to the target value to the greatest possible degree. As a result, the setup slack value or the hold slack value can be improved on the critical path, and the operation characteristics of the integrated circuit can be further stabilized.

Moreover, the method in the first working example is that the gate length is, as illustrated in FIG. 15, adjusted in the way of being targeted at the transistor of which the predicted threshold value is deep to some extent and of which the threshold voltage is relatively high. Therefore, as depicted in FIG. 4, the decrease in threshold value, i.e., the reduction in gate length is targeted at the transistor of which the threshold value is deeper than the target threshold value or the threshold value of the standard transistor. Accordingly, the threshold value can avoid adjusting in the region where the off-leak current abruptly rises as the threshold value decreases. Namely, according to the integrated circuit manufacturing method of the first working example, the threshold value can be decreased in the way of being targeted at the transistor enabled to restrain the off-leak current from rising.

Note that the performance of the transistor is improved by extracting the critical path from the design data in the first working example. In place of this procedure, however, after executing the setting process so as to deepen the threshold values of the transistors of the whole chip, the procedure depicted in FIG. 8 may also be carried out. To be specific, after temporarily deepening the threshold values of the transistors and making such a design as to lessen the off-leak current on the whole chip, the performance of the transistor with respect to the critical path is improved by executing the procedure depicted in FIG. 8, and, after decreasing the power consumption of the whole chip, the circuit including the transistors is speeded up, thereby enabling the power consumption to be reduced at the same chip speed. Further, an allowance for the timing error can be expanded by relaxing the timing condition of the critical path.

Second Working Example

The integrated circuit manufacturing method according to a second working example will be described with reference to FIG. 18. In the first working example, after the manufacture, the relation between the parameter of the peripheral layout information of the transistor and the threshold value of the transistor is acquired from the measured values of the transistor, and the gate dimension is adjusted so as to reach the target value. Namely, what has been discussed is the case of improving the chip performance after manufacturing the integrated circuit. The reticle is, however, modified for improving the chip performance before being manufactured as the case may be.

Generally, the case of implementing the chip design involves performing circuit simulation by use of a SPICE (Simulation Program with Integrated Circuit Emphasis) model for expressing the characteristics of the transistor. Such a case might, however, arise that a device characteristic expressed by the SPICE model is often different from a device characteristic on actual silicon (Si). The different characteristic connoted herein implies a difference of the state depending on the peripheral layout information. In this case also, it is possible to apply the integrated circuit manufacturing method described in the first working example.

Figure 18:
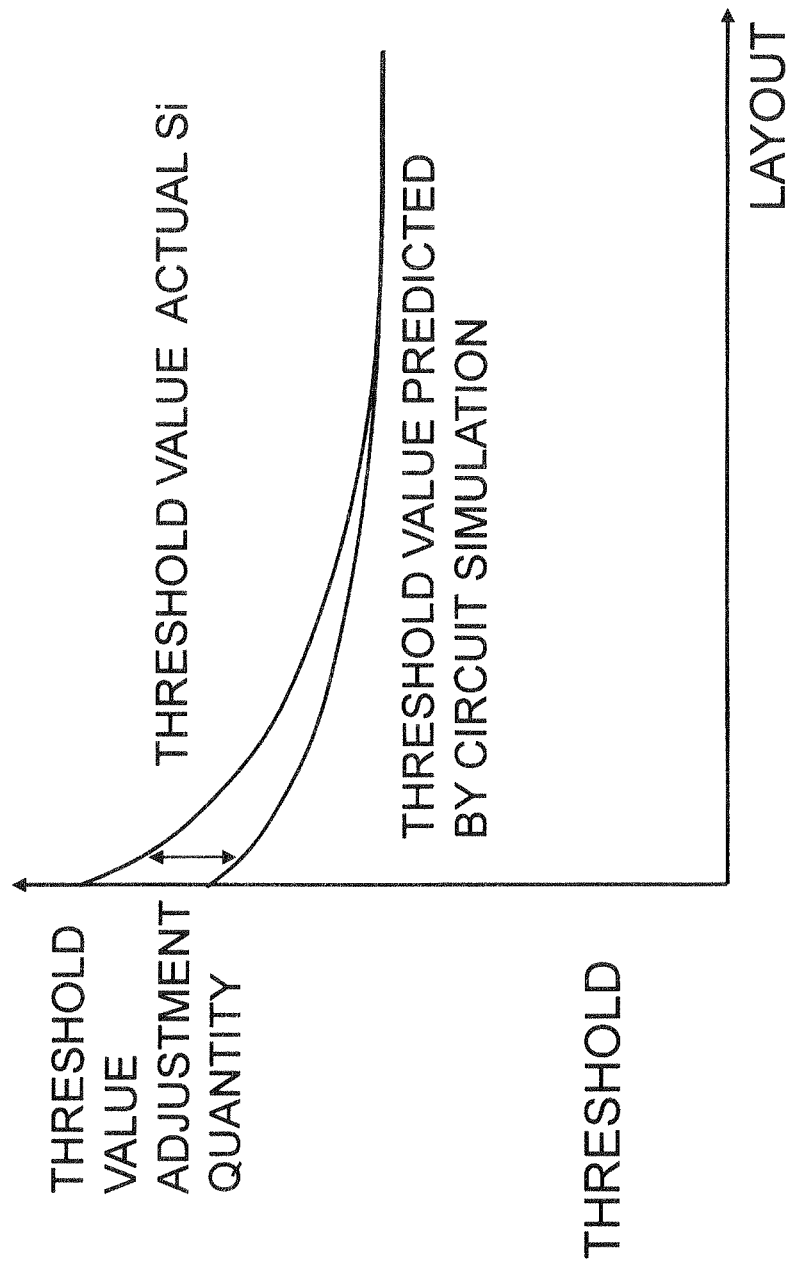
FIG. 18 is a diagram illustrating an applied example in the case of getting a threshold value on actual silicon approximate to a threshold value in circuit simulation.

FIG. 18 illustrates an applied example of the technique according to the second working example in the case of getting the threshold value on the actual silicon (Si) approximate to the threshold value in the circuit simulation. Namely, there is adopted a relation between the threshold value of the SPICE model in place of the target threshold value illustrated in FIG. 15 and the peripheral layout information. To be specific, the threshold value predicted in the circuit simulation connotes the threshold value used when executing the circuit simulation. The threshold value predicted in the circuit simulation is determined from values accumulated based on the device simulation or empirically by the user when executing the circuit simulation. Further, in FIG. 18, the actual on-silicon threshold value is the threshold value calculated from the model formula in the mathematical expression 2 or 3.

The technique in the second working example can be, as depicted in FIG. 18, if the actual on-silicon threshold value is not coincident with the threshold value predicted in the circuit simulation, applied in order to decrease a difference therebetween. In this case also, for instance, the operation speed is improved by making shallow the threshold value of the transistor of which the signal propagation time is slow on the critical path and augmenting the ON-current. As a result, for example, the slack value on the critical path is further improved, thereby enabling the degree of allowance to be increased. As a matter of course, any inconvenience may not be caused by executing the remaining processes from the SP5 onward with respect to the whole chip (the entire transistor) without being limited to the critical path (excluding steps SP1-SP4 in FIG. 8).

Third Working Example

Figure 19:
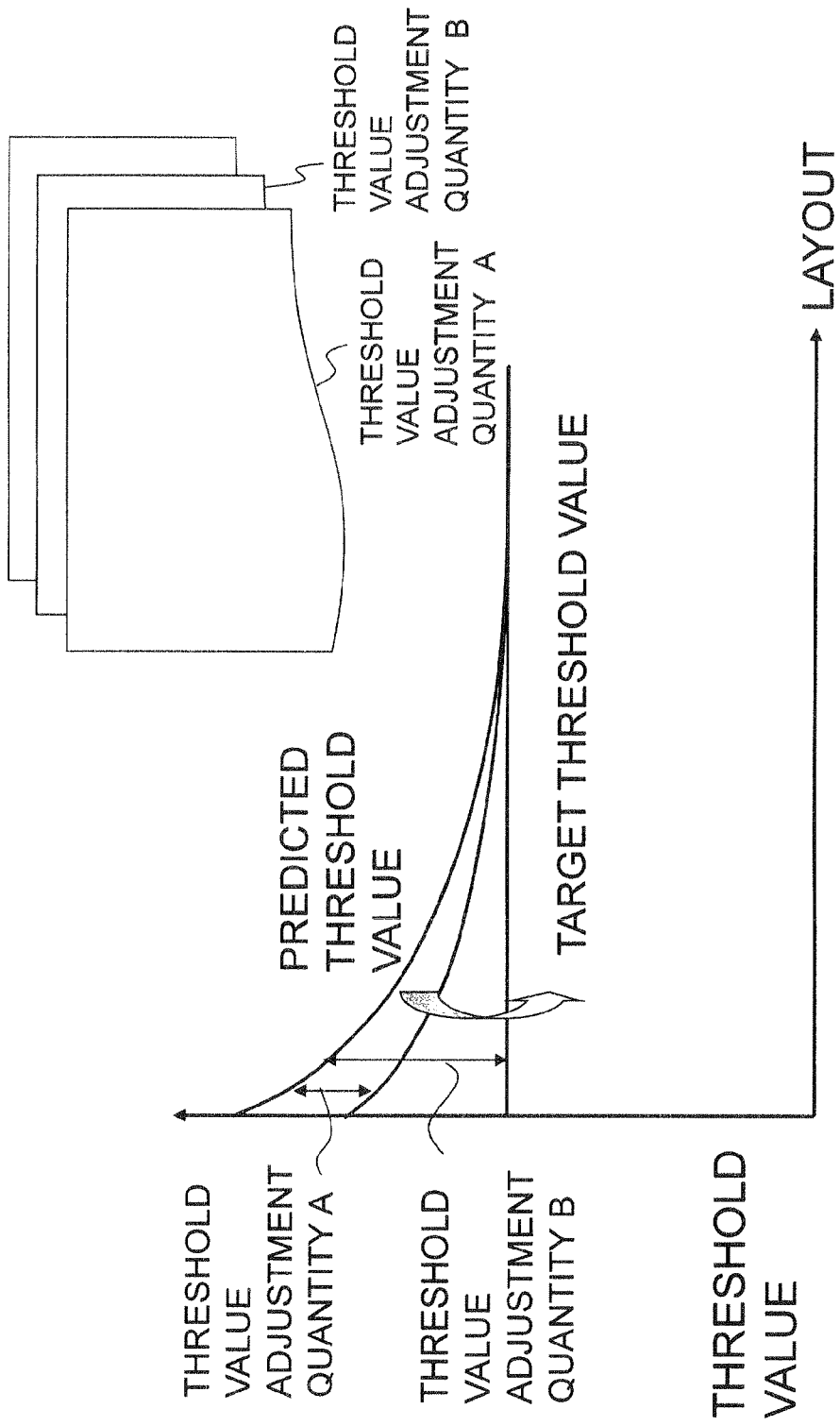
FIG. 19 is a diagram illustrating an example of a cell library in which the threshold value is adjusted at a plurality of stages.

The integrated circuit manufacturing method according to a third working example will be described with reference to FIGS. 19 and 20. In the first working example, the scheme involves extracting the critical path from the design data of the integrated circuit, and trying to decrease the threshold value and to increase the ON-current of the transistor having the threshold value larger than target threshold value in the transistors embraced on the critical path. More specifically, the gate length of the transistor is reduced corresponding to the increase quantity of the threshold value.

As a substitute for these processes, a plurality of cell libraries may also be previously provided, in which the threshold value is adjusted to a different target threshold value by reducing the gate length. The cell libraries, in which the threshold values are adjusted at a plurality of stages such as threshold value adjustment quantities A, B, . . . for the original cell data containing the threshold values predicted from the model formula of the mathematical expressions 1 and 2, are organized and provided to a variety of design support tools. FIG. 19 exemplifies the cell libraries in which the threshold values are adjusted at the plurality of stages. Namely, the assumption in the first and second working examples is based on performing the dimensional correction of the gate length about the whole chip. By contrast, in the third working example, the sizing of the gate length is conducted for the cell registered in the cell library. A method of preparing the plurality of cells having the same function but different speeds and different power consumptions and swapping the cells to match with desired characteristics has hitherto been implemented, however, in this case the threshold value is adjusted based on the ion implantation to thereby require an implantation mask for each of the plurality of cells, with the result that the costs, as a matter of course, rise due to an increase in the number of processing steps. In the technique according to the third working example, however, only the gate length is changed on the same mask, and hence an additional cost does not occur.

Figure 20:
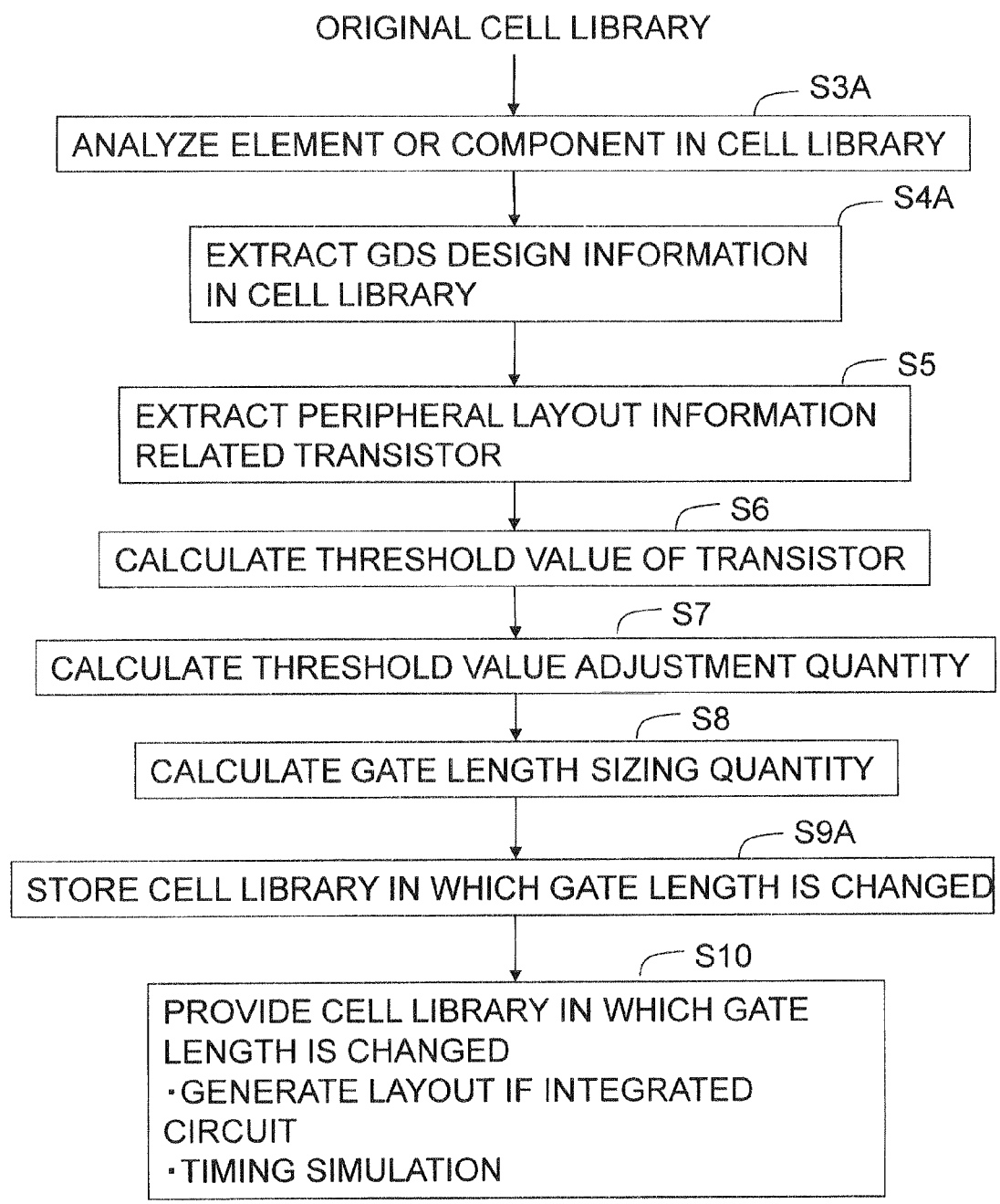
FIG. 20 is a diagram illustrating an example of a process of generating the plurality of cell libraries corresponding to threshold value adjustment quantities and providing the cell libraries to a design tool.

FIG. 20 illustrates an example of a process of generating the plurality of cell libraries corresponding to the threshold value adjustment quantities and providing the design tools. In FIG. 20, the same processes as those in FIG. 8 are marked with the same numerals and symbols, and the descriptions thereof are omitted.

The design support device 10 reads the cell information from the original cell library before changing the gate dimension, and analyzes the element or the component (S3A). The specific process is the same as S3 in FIG. 8.

Then, the design support device 10 extracts the layout pattern of the cell about the transistor in the element read from the cell library (S4A). The processes from S5-S8 onward are the same as those in FIG. 8.

Then, the design support device 10 stores, in the new cell library, the layout of the transistor of which the gate length is changed (S9A). The cell library may be structured so that a search can be made with a post-change value of the threshold value. For instance, a new cell library may be retained in such a way that the threshold value adjustment quantity is associated with the threshold value of the original cell library. The process in S9A corresponds to a step of storing a design pattern shape of the circuit element including the transistor with the changed gate length which is associated with the target threshold value or a difference between the threshold value and the target threshold value.

Then, the design support device 10 may provide to, e.g., the layout tool, the new cell library in which the threshold value is changed in response to the user's designation. The design support device 10 may provide the cell library including the threshold value adjustment quantity desired by the user in response to the user's designation. Then, the layout tool can generate the layout of the integrated circuit by use of the cell library with the threshold value being changed. Further, the design support device 10 may provide to, e.g., a timing simulation tool, the new cell library of which the threshold value is changed in response to the user's designation. Then, the simulation tool can execute the timing simulation of the integrated circuit by employing the cell library in which the threshold value is changed (S10). The process in S10 corresponds to a step of receiving at least one request of the cell library or the new cell library and providing the cell library to a requester side.

Note that the procedures of manufacturing the integrated circuit on the basis of the design data designed from the provided cell library in accordance with the procedures described above are the same as those in S2 and S3 of FIG. 5.

As described above, the design support device in the third working example enables the circuit simulation using the value of the changed gate length by outputting the gate length modified after performing the dimensional correction of the gate length onto the netlist. Then, the design support device 10 registers the cell delay information of the changed gate length in the cell library, and can make the circuit design based on the new circuit simulation (STA (Static Timing Analysis) etc) by using the cell delay information after changing the gate dimension. Namely, according to the third working example, plural types of setting information of the target threshold values depending on the layout are prepared, and the cells undergoing the gate length sizing at the different levels can be prepared, resulting in the improvement of the degree of the freedom of the design and the manufacture.

Fourth Working Example

Figure 21:
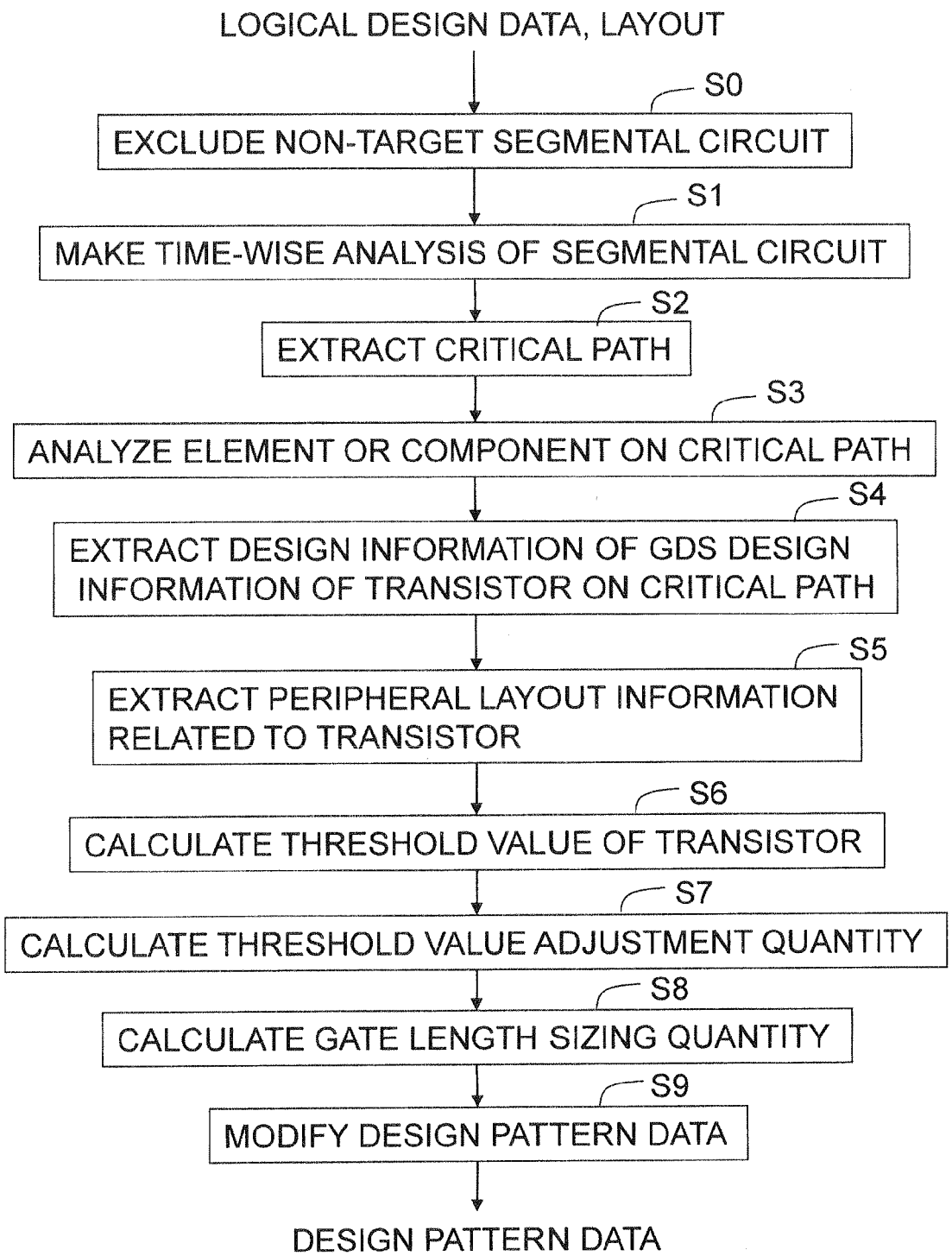
FIG. 21 is an example of a flowchart of processes including a process of excluding a non-target segmental circuit.

The integrated circuit manufacturing method according to a fourth working example will be described with reference to FIG. 21. In the first working example, the scheme involves extracting the critical path from the design data of the integrated circuit and trying to decrease the threshold value and to increase increasing the ON-current of the transistor having the threshold value larger than target threshold value in the transistors embraced on the critical path. More specifically, the gate length of the transistor is reduced corresponding to the increase quantity of the threshold value.

In these processes, the specified transistor group, e.g., the analog circuit, the SRAM, etc may be excluded from the processing target component. In the transistor group excluded from the processing target component, for instance, a rectangular pattern indicating an out-of-processing-target component may be incorporated with a layer number different from the layout pattern of the circuit on the layout data of the chip. Subsequently, on the occasion of acquiring the connection information of the segmental circuit in the design data, the critical path may be extracted, and the gate length sizing may be executed in a way that excludes the segmental circuit included in the rectangular pattern representing the out-of-processing-target component. FIG. 21 illustrates an example of a flowchart of processes including the process (S0) of excluding the non-target segmental circuit. The process (S0) of excluding the non-target segmental circuit corresponds to an excluding step.

Note that as for the out-of-processing-target segmental circuit, the layer number of the layout pattern is set as the layer number that is different from the layer number of the processing target segmental circuit, and may be, when executing the LVS check, set as the out-of-processing-target component. Furthermore, the segmental circuit becoming the out-of-processing-target component may also be specified by accepting the user's operation for designating the region. Moreover, in the process of S9 in FIG. 20, the design pattern data changing process may involve changing the gate length by excluding the layer number of the out-of-processing-target segmental circuit.

Through the procedures described above, the gate length or the threshold value can be adjusted in a way that stores the transistors of which the gate lengths or the threshold values are not adjusted and narrows these transistors down to the transistor enabled to adjust the gate length or the threshold value.

Fifth Working Example

The integrated circuit manufacturing method according to a fifth working example will be described with reference to FIG. 22. In the first working example, the scheme involves extracting the critical path from the design data of the integrated circuit and trying to decrease the threshold value and to increase the ON-current of the transistor having the threshold value larger than target threshold value in the transistors embraced on the critical path. More specifically, the gate length of the transistor is reduced corresponding to the decrease quantity of the threshold value. Owing to these processes, the critical path has a further allowance, thereby enabling the stable integrated circuit to be manufactured. A further addition of the fifth working example to the processes explained in the first through fourth working examples is a channel impurity implantation process of increasing a dose quantity of the impurity by a predetermined value in the processes of manufacturing the integrated circuit.

Figure 22:
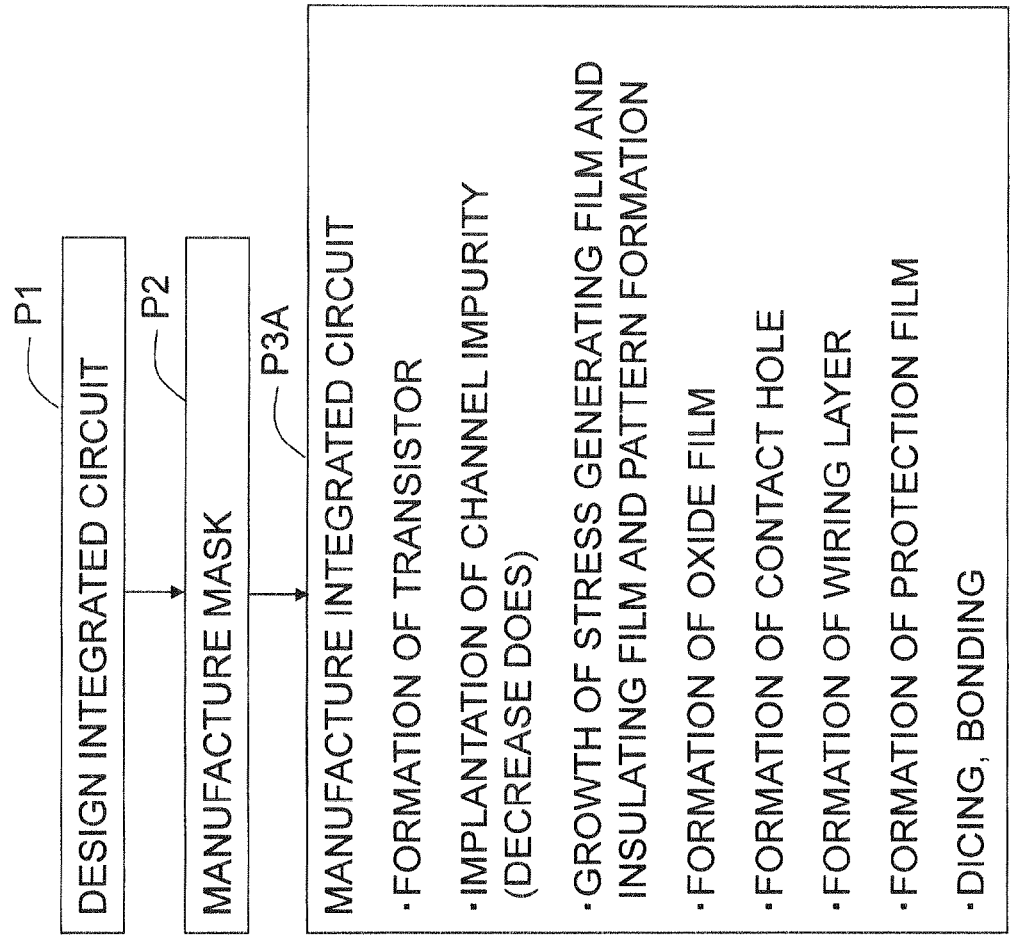
FIG. 22 is an example of a flowchart of processes including a process of deepening each of the threshold values with respect to a plurality of transistors within the chip.

FIG. 22 illustrates an example of the integrated circuit manufacturing process according to the fifth working example. In FIG. 22, the processes P1 and P2 are the same as those in FIG. 5, and hence their explanations are omitted. To be specific, in the integrated circuit design process P1, the predicted threshold value is changed based on reducing the gate length in accordance with the difference between the target threshold value and the predicted threshold value according to FIG. 15.

Then, in the fifth working example, in the channel impurity implantation process of the transistor during the integrated circuit manufacturing process, the dose quantity of the impurity designated in the transistor before changing the threshold value based on the reduction in gate length, is increased by the predetermined value. The dose quantity may be increased uniformly on the whole chip. Further, the increase quantity in dose quantity may also be determined empirically. For example, a relation between the power consumption of the chip and a yield etc. thereof the increase quantity of the dose, is empirically obtained, and a proper dose increase quantity may be determined. Namely, after temporarily making shallow the threshold value of the transistor on the critical path within the chip by reducing the gate length, a limit to which the dose quantity can be increased may be empirically acquired. The increase quantity may be specified based on the dose quantity (the impurity implantation quantity per unit area). Moreover, the increase quantity may also be specified by an increment ratio (%) to a pre-increase design value. For instance, the ion implantation time may be elongated corresponding to the increase quantity or the increment ratio.

Then, in the same way as in the case of FIG. 5, in other processes, e.g., the wire connected to the element and a plug for connecting the element to the wire are provided by forming a stress generation film (DSL film etc), the insulating film such as the oxide film, the contact hole and the wiring layer. Further, the semiconductor device is manufactured via the processes such as forming the protection film, dicing and bonding (P3A).

In this case, the influence of the rise in channel dose is different depending on the number of the transistors existing on the respective paths and depending on which transistor is specified on the two paths as illustrated in FIG. 7. Accordingly, the difference in signal propagation time between the two paths after changing the dose quantity of the channel impurity differs from that at the design stage. Therefore, in the case of simply increasing the channel dose in the manufacturing process without executing the process of making shallow the threshold value of the transistor based on reducing the gate length as exemplified in the first through fourth working examples, there is a possibility of increasing the timing error.

According to the integrated circuit manufacturing method in the fifth working example, however, the critical path undergoes the execution of the process of relaxing the threshold value with respect to the transistor having the deep threshold value by adjusting the gate length beforehand in the same procedures as those in the first through fourth working examples. Accordingly, in the integrated circuit manufacturing process, even when uniformly increasing the on-chip channel dose by the predetermined value, such a possibility rises as to restrain the timing error from occurring or restrain the yield from decreasing. Further, the proper increase quantity of the dose of the channel impurity can be determined from the empirical value and the experimental value within the range enabled to restrain the timing error from occurring or to restrain the yield from decreasing. In the range enabled to restrain the timing error from occurring or to restrain the yield from decreasing, for instance, the channel dose may be determined so that the decrease in yield due to the occurrence of the timing error of the chip manufactured in the experimental manufacturing process converges at the target value. For example, the channel dose is increased stepwise such as N1%, N2%, ... Nm %, the decrease in yield due to the timing error in each channel dose may thus be experimentally obtained. Then, the increase quantity of the dose of the channel impurity may be determined within the range in which the yield reaches the target value.

As discussed above, according to the integrated circuit manufacturing method in the fifth working example, with respect to the critical path, the power consumption of the chip can be restrained after restraining the timing error from occurring or restraining the yield from decreasing in the same procedures as in the first through fourth working examples.

Note that in place of adjusting the gate length in the same procedures as in the first through fourth working examples with respect to the critical path in the fifth working example, the gate length may also be adjusted for all of the transistors of the whole chip. Further, for instance, the gate length may also be adjusted by selecting the transistor having the deeper threshold value than the target threshold value in the transistors of the whole chip (see FIG. 15.)

<<Readable-by-Computer Recording Medium>>

A program for making a computer, other machines and devices (which will hereinafter be referred to as the computer etc) realize any one of the functions can be recorded on a recording medium readable by the computer etc. Then, the computer etc is made to read and execute the program on this recording medium, whereby the function thereof can be provided.

Herein, the recording medium readable by the computer etc connotes a recording medium capable of storing information such as data and programs electrically, magnetically, optically, mechanically or by chemical action, which can be read from the computer etc. Among these recording mediums, for example, a flexible disc, a magneto-optic disc, a CD-ROM, a CD-R/W, a DVD, a Blu-ray disc, a DAT, an 8 mm tape, a memory card such as a flash memory, etc are given as those removable from the computer. Further, a hard disc, a ROM (Read-Only Memory), etc are given as the recording mediums fixed within, the computer etc.

What is claimed is:

1. An integrated circuit manufacturing method comprising:
   calculating a period of signal propagation time of a path within a circuit in accordance with a signal propagation characteristic of circuit elements included in the circuit and a signal propagation characteristic of a transmission path which connects the circuit elements to each other;

selecting, by a computer, a path, as a target path, of which the signal propagation time does not satisfy a predetermined standard;

extracting a value of a parameter which characterizes at least a part of a shape of a design pattern of a transistor on the target path;

calculating, by the computer, a threshold value of the transistor from the extracted parameter value according to a functional relation between the parameter and the threshold value of the transistor, which is determined based on a first empirical value or a first experimental value;

calculating, by the computer, a difference between the calculated threshold value and a target threshold value;

calculating, by the computer, a change quantity of a gate length corresponding to the difference between the calculated threshold value and the target threshold value according to the functional relation between the threshold value of the transistor and the gate length, which is determined based on a second empirical value or a second experimental value; and changing, by the change quantity, the gate length of the transistor on the target path; and manufacturing, by a manufacturing device, an integrated circuit based on design information of the circuit including the transistor of which the gate length is changed.

2. The integrated circuit manufacturing method according to claim 1, further comprising:

excluding, by the computer, based on region information for specifying an existing region of the path or classification information for classifying shape information for defining the shape of the design pattern into plural types of shape information, the path within the existing region or the shape information of the specified classification design pattern from processing target items of the selecting.

3. The integrated circuit manufacturing method according to claim 1, wherein the functional relation is defined by a polynomial expression in which a relation between a value of the parameter and the threshold value of the transistor is approximately estimated or by a table containing a relation in which the value of the parameter is associated with the threshold value of the transistor having the value of the parameter.

4. The integrated circuit manufacturing method according to claim 1, wherein the functional relation includes a second functional relation determined corresponding to the value of each parameter related to a dimension of a gate, wherein the second functional relation is a relation in which a parameter other than the parameter related to the dimension of the gate is associated with a differential value between a reference threshold value and the threshold value of the transistor.

5. An integrated circuit design method executed by a computer comprising:

calculating a period of signal propagation time of a path within a circuit in accordance with a signal propagation characteristic of circuit elements included in the circuit and a signal propagation characteristic of a transmission path which connects the circuit elements to each other;

selecting a path, as a target path, of which the signal propagation time does not satisfy a predetermined standard;

extracting a value of a parameter which characterizes at least a part of a shape of a design pattern of a transistor on the target path;

calculating a threshold value of the transistor from the extracted parameter value according to a functional relation between the parameter and the threshold value of the transistor, which is determined based on a first empirical value or a first experimental value;

calculating a difference between the calculated threshold value and a target threshold value;

calculating a change quantity of a gate length corresponding to the difference between the calculated threshold value and the target threshold value according to the functional relation between the threshold value of the transistor and the gate length, which is determined based on a second empirical value or a second experimental value; and changing, by the change quantity, the gate length of the transistor on the target path.

6. A non-transitory computer readable recording medium recorded with a program which, when executed by a computer, causes the computer to execute an integrated circuit design method comprising:

calculating a period of signal propagation time of a path within a circuit in accordance with a signal propagation characteristic of circuit elements included in the circuit and a signal propagation characteristic of a transmission path which connects the circuit elements to each other;

selecting a path, as a target path, of which the signal propagation time does not satisfy a predetermined standard;

extracting a value of a parameter which characterizes at least a part of a shape of a design pattern of a transistor on the target path;

calculating a threshold value of the transistor from the extracted parameter value according to a functional relation between the parameter and the threshold value of the transistor, which is determined based on a first empirical value or a first experimental value;

calculating a difference between the calculated threshold value and a target threshold value;

calculating a change quantity of a gate length corresponding to the difference between the calculated threshold value and the target threshold value according to the functional relation between the threshold value of the transistor and the gate length, which is determined based on a second empirical value or a second experimental value; and changing, by the change quantity, the gate length of the transistor on the target path.

7. An integrated circuit manufacturing method comprising:

extracting a value of a parameter which characterizes at least a part of a shape of a design pattern of a transistor included in a cell library;

calculating, by a computer, a threshold value of the transistor from the extracted parameter value according to a functional relation between the parameter and the threshold value of the transistor, which is determined based on a first empirical value or a first experimental value;

calculating, by the computer, a difference between the calculated threshold value and a target threshold value;

calculating, by the computer, a change quantity of a gate length corresponding to the difference between the calculated threshold value and the target threshold value according to the functional relation between the threshold value of the transistor and the gate length, which is determined based on a second empirical value or a second experimental value;

changing, by the change quantity, the gate length of the transistor included in the cell library;

storing the shape of the design pattern of circuit elements including the transistor of which the gate length is changed as a new cell library in a way of being associated with the target threshold value or the difference between the calculated threshold value and the target threshold value;

providing, upon receiving a request for at least one of the cell library and the new cell library, the requested cell library to a requester side; and manufacturing, by a manufacturing device, an integrated circuit based on design information designed using the requested cell library provided.

8. An integrated circuit design method executed by a computer comprising:

extracting a value of a parameter which characterizes at least a part of a shape of a design pattern of a transistor included in a cell library;

calculating a threshold value of the transistor from the extracted parameter value according to a functional relation between the parameter and the threshold value of the transistor, which is determined based on a first empirical value or a first experimental value;

calculating a difference between the calculated threshold value and a target threshold value;

calculating a change quantity of a gate length corresponding to the difference between the calculated threshold value and the target threshold value according to the functional relation between the threshold value of the transistor and the gate length, which is determined based on a second empirical value or a second experimental value;

changing, by the change quantity, the gate length of the transistor included in the cell library;

storing the shape of the design pattern shape of circuits element including the transistor of which the gate length is changed as a new cell library in a way of being associated with the target threshold value or the difference between the calculated threshold value and the target threshold value;

providing, upon receiving a request for at least one of the cell library and the new cell library, the requested cell library to a requester side; and manufacturing an integrated circuit based on design information designed using the requested cell library provided.

9. An integrated circuit manufacturing method comprising:

calculating a period of signal propagation time of a path within a circuit in accordance with a signal propagation characteristic of circuit elements included in the circuit and a signal propagation characteristic of a transmission path which connects the circuit elements to each other;

selecting a path, as a target path, of which the signal propagation time does not satisfy a predetermined standard;

extracting a value of a parameter which characterizes at least a part of a shape of a design pattern of a transistor on the target path;

calculating, by a computer, a threshold value of the transistor from the extracted parameter value according to a functional relation between the parameter and the threshold value of the transistor, which is determined based on a first empirical value or a first experimental value;

calculating, by the computer, a difference between the calculated threshold value and a target threshold value;

calculating, by the computer, a change quantity of a gate length corresponding to the difference between the calculated threshold value and the target threshold value according to the functional relation between the threshold value of the transistor and the gate length, which is determined based on a second empirical value or a second experimental value;

changing, by the change quantity, the gate length of the transistor on the target path; and manufacturing, by a manufacturing device, an integrated circuit based on design information of the circuit including the transistor of which the gate length is changed, wherein the manufacturing includes implanting a channel impurity with a concentration increased by a predetermined increase quantity, which is designated in a circuit including the transistor before the gate length is changed.

10. A non-transitory computer readable recording medium recorded with a program which, when executed by a computer, causes the computer to execute an integrated circuit design method comprising:

extracting a value of a parameter which characterizes at least a part of a shape of a design pattern of a transistor included in a cell library;

calculating a threshold value of the transistor from the extracted parameter value according to a functional relation between the parameter and the threshold value of the transistor, which is determined based on a first empirical value or a first experimental value;

calculating a difference between the calculated threshold value and a target threshold value;

calculating a change quantity of a gate length corresponding to the difference between the calculated threshold value and the target threshold value according to the functional relation between the threshold value of the transistor and the gate length, which is determined based on a second empirical value or a second experimental value;

changing, by the change quantity, the gate length of the transistor included in the cell library;

storing the shape of the design pattern of circuit elements including the transistor of which the gate length is changed as a new cell library in a way of being associated with the target threshold value or the difference between the calculated threshold value and the target threshold value;

providing, upon receiving a request for at least one of the cell library and the new cell library, the requested cell library to a requester side; and manufacturing an integrated circuit based on design information, the design information designed based on the provided cell library.

* * * * *

UNITED STATES PATENT AND TRADEMARK OFFICE
CERTIFICATE OF CORRECTION

| | | |
|---|---|---|
| PATENT NO. | : 8,484,597 B2 | |
| APPLICATION NO. | : 13/075789 | |
| DATED | : July 9, 2013 | |
| INVENTOR(S) | : Arimoto | |

It is certified that error appears in the above-identified patent and that said Letters Patent is hereby corrected as shown below:

In the claims:

Column 23, line 32, claim 8
--~~the design pattern shape of circuits~~-- should read as --the design pattern of circuits--

Signed and Sealed this
Thirteenth Day of May, 2014

Michelle K. Lee
*Deputy Director of the United States Patent and Trademark Office*